(12) United States Patent
Klinger et al.

(10) Patent No.: US 11,478,939 B2
(45) Date of Patent: Oct. 25, 2022

(54) POSITION VERIFICATION SENSOR WITH DISCRETE OUTPUT

(71) Applicant: Government of the United States of America, as represented by the Secretary of Commerce, Gaithersburg, MD (US)

(72) Inventors: Alexander Scott Klinger, Silver Spring, MD (US); Brian Adam Weiss, Boyds, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 567 days.

(21) Appl. No.: 16/572,847

(22) Filed: Sep. 17, 2019

(65) Prior Publication Data
US 2020/0086501 A1    Mar. 19, 2020

Related U.S. Application Data

(60) Provisional application No. 62/732,059, filed on Sep. 17, 2018.

(51) Int. Cl.
*B25J 9/16*    (2006.01)
*B25J 13/08*   (2006.01)
*G01B 7/31*    (2006.01)

(52) U.S. Cl.
CPC .......... *B25J 13/087* (2013.01); *B25J 9/1653* (2013.01); *G01B 7/31* (2013.01)

(58) Field of Classification Search
USPC .............................................. 33/502; 73/1.79
See application file for complete search history.

(56) References Cited

U.S. PATENT DOCUMENTS

| 3,417,475 | A | * | 12/1968 | Vlasaty | G01B 3/30 |
| | | | | | 33/502 |
| 4,477,978 | A | * | 10/1984 | Azuma | G01B 7/004 |
| | | | | | 33/600 |
| 4,485,453 | A | * | 11/1984 | Taylor | G05B 19/42 |
| | | | | | 901/45 |
| 4,523,450 | A | * | 6/1985 | Herzog | G01B 21/042 |
| | | | | | 33/502 |

(Continued)

*Primary Examiner* — Christopher W Fulton
(74) *Attorney, Agent, or Firm* — Office of Chief Counsel for National Institute of Standards and Technology

(57) ABSTRACT

A position verification sensor produces a discrete output for determining an accuracy of mutual mechanical positioning with a key and includes: a substratum; a housing; a receiver pad that: receives contact with the key; produces a target output in contact with the key; and produces a null output in absence of contact with the key; an aperture cap having: a cap surface; and the keyway aperture that selectively communicates the key; and a compliant member that: rests in a primary position in an absence of the key disposed on the cap surface; receives the depression force from the aperture cap; reciprocatively depresses, from the primary position to a depressed position, in response to receiving the depression force and being pushed by the depression force from the key; and reciprocatively returns, from the depressed position to the primary position, when the key is removed from contact with the aperture cap.

13 Claims, 33 Drawing Sheets

(56) References Cited

U.S. PATENT DOCUMENTS

| | | | | |
|---|---|---|---|---|
| 5,187,874 | A * | 2/1993 | Takahashi | G01B 3/002 73/1.79 |
| 6,519,860 | B1 * | 2/2003 | Bieg | B23H 7/26 73/1.79 |
| 6,886,264 | B2 * | 5/2005 | Sakata | G01B 7/12 73/1.79 |
| 7,337,651 | B2 * | 3/2008 | Shankarappa | G01N 27/9013 73/1.79 |
| 7,712,370 | B2 * | 5/2010 | Furukawahara | G01H 11/08 73/1.79 |
| 7,918,033 | B2 * | 4/2011 | Held | G01B 21/042 33/502 |
| 8,825,423 | B1 * | 9/2014 | Brovoid | G01N 3/08 702/41 |
| 2014/0059872 | A1 * | 3/2014 | Nakagawa | G01B 21/045 33/502 |
| 2021/0331330 | A1 * | 10/2021 | Jiang | B25J 13/087 |

\* cited by examiner (a) Link Representation (b) Example: Robot (c) Example: Gripper (a) Generic Chain Representation (b) Example: Robot and Gripper (a) Link 1 Inspection (b) Link 2 Inspection

US 11,478,939 B2

POSITION VERIFICATION SENSOR WITH DISCRETE OUTPUT

CROSS REFERENCE TO RELATED APPLICATIONS

The application claims priority to U.S. Provisional Patent Application Ser. No. 62/732,059 filed Sep. 17, 2018, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 18-067US1.

BRIEF DESCRIPTION

Disclosed is a position verification sensor that produces a discrete output for determining an accuracy of mutual mechanical positioning with a key, the position verification sensor comprising: a substratum; a housing disposed on the substratum; a receiver pad disposed in the housing and that: receives contact with the key when the key is communicated through a keyway aperture; produces a target output in response to contact with the key; and produces a null output in absence of contact with the key; an aperture cap disposed on the housing and comprising: a cap surface; and the keyway aperture disposed in the aperture cap and bounded by a wall of the aperture cap, the keyway aperture comprising a shape and size selected to receive and selectively communicate the key through the keyway aperture, such that the aperture cap: selectively communicates the key through the keyway aperture to the receiver pad when the key and the keyway aperture are compatibly aligned; and receives the key on the cap surface when the key and the keyway aperture are incompatibly aligned so that: the key contacts the cap surface instead of being communicated through the keyway aperture; and receives a depression force from the key, the receiver pad being interposed between the substratum and the aperture cap; and a compliant member interposed between the substratum and the housing through which the substratum and the housing are in mechanical communication and that: rests in a primary position in an absence of the key disposed on the cap surface of the aperture cap; receives the depression force from the aperture cap; reciprocatively depresses, from the primary position to a depressed position, in response to receiving the depression force and being pushed by the depression force from the key; and reciprocatively returns, from the depressed position to the primary position, when the key is removed from contact with the aperture cap.

A process for determining an accuracy of mutual mechanical positioning of a key and position verification sensor, the process comprising: moving the key relative to the position verification sensor; contacting position verification sensor with the key; producing the null output if the key does not contact the receiver pad; and producing the target output if the key contacts the receiver pad.

A process for determining an accuracy of mutual mechanical positioning of a key and position verification sensor, the process comprising: moving the key relative to the position verification sensor; contacting position verification sensor with the key; producing the null output if the key does not contact the receiver pad; and producing the second target output if the key contacts the second receiver pad.

BRIEF DESCRIPTION OF THE DRAWINGS

The following description should not be considered limiting in any way. With reference to the accompanying drawings, like elements are numbered alike.

DETAILED DESCRIPTION

Figure 1:
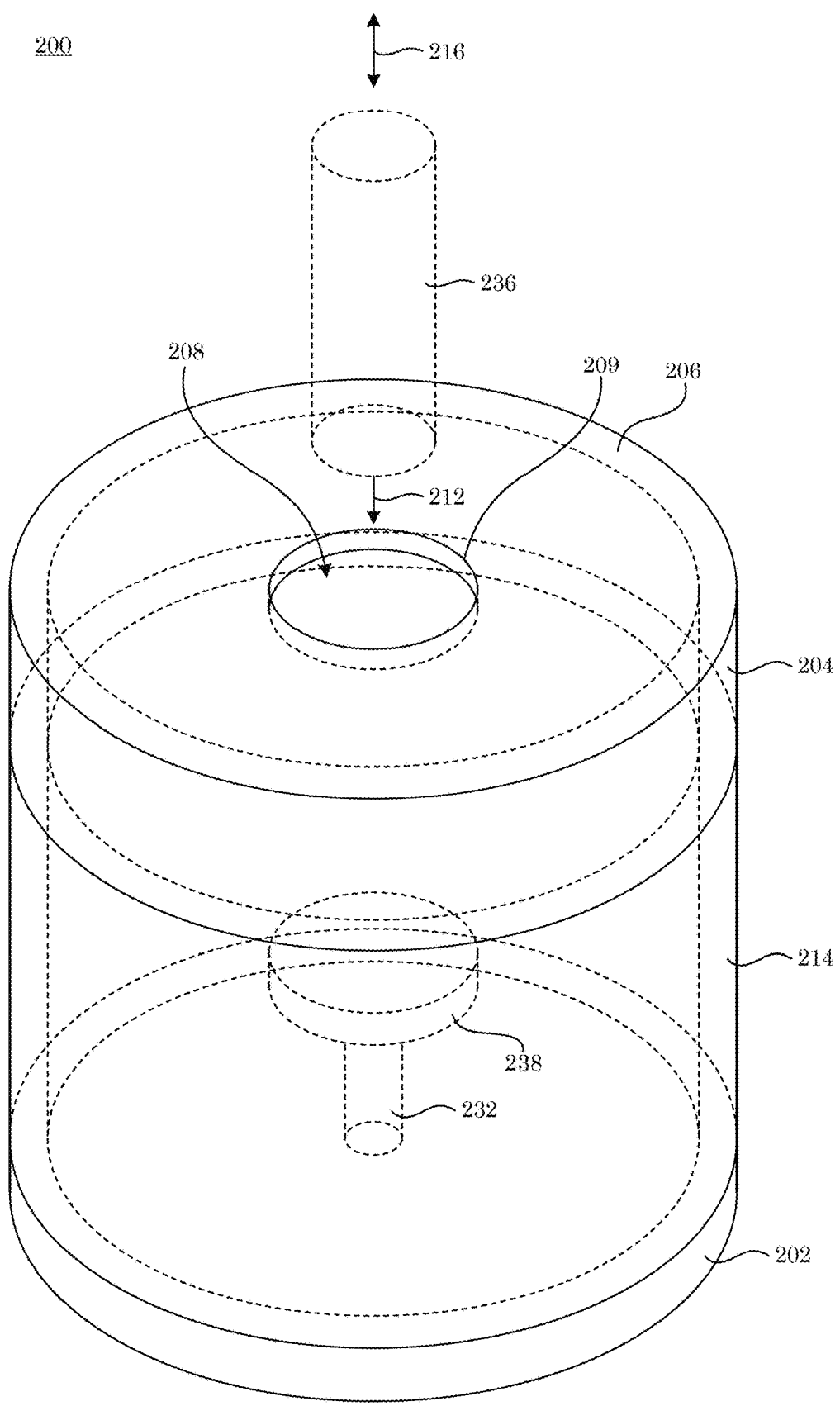
FIG. 1 shows a perspective view of a position verification sensor.
Figure 2:
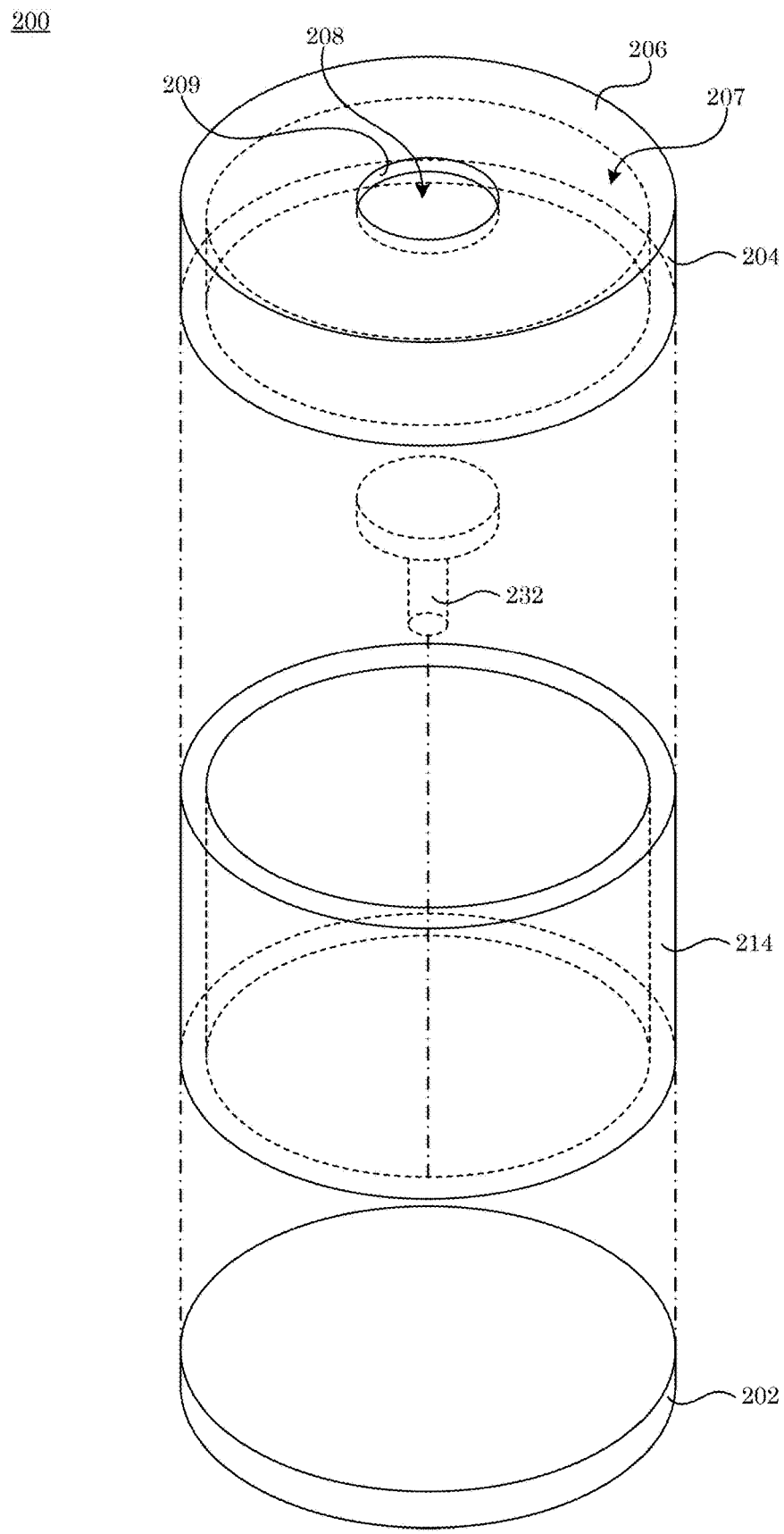
FIG. 2 shows an exploded view of a position verification sensor.
Figure 3:
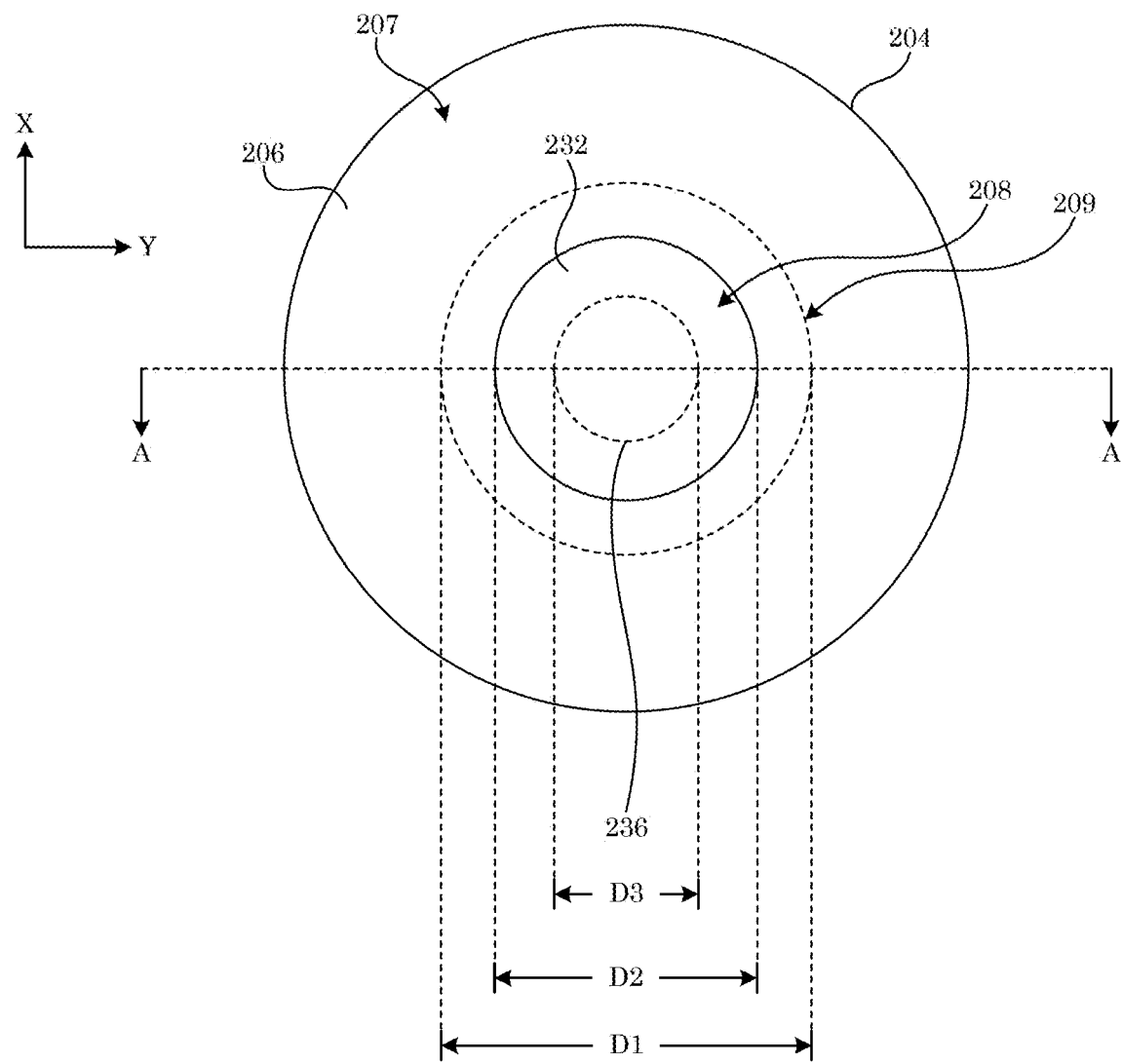
FIG. 3 shows a plan view of a position verification sensor.
Figure 4:
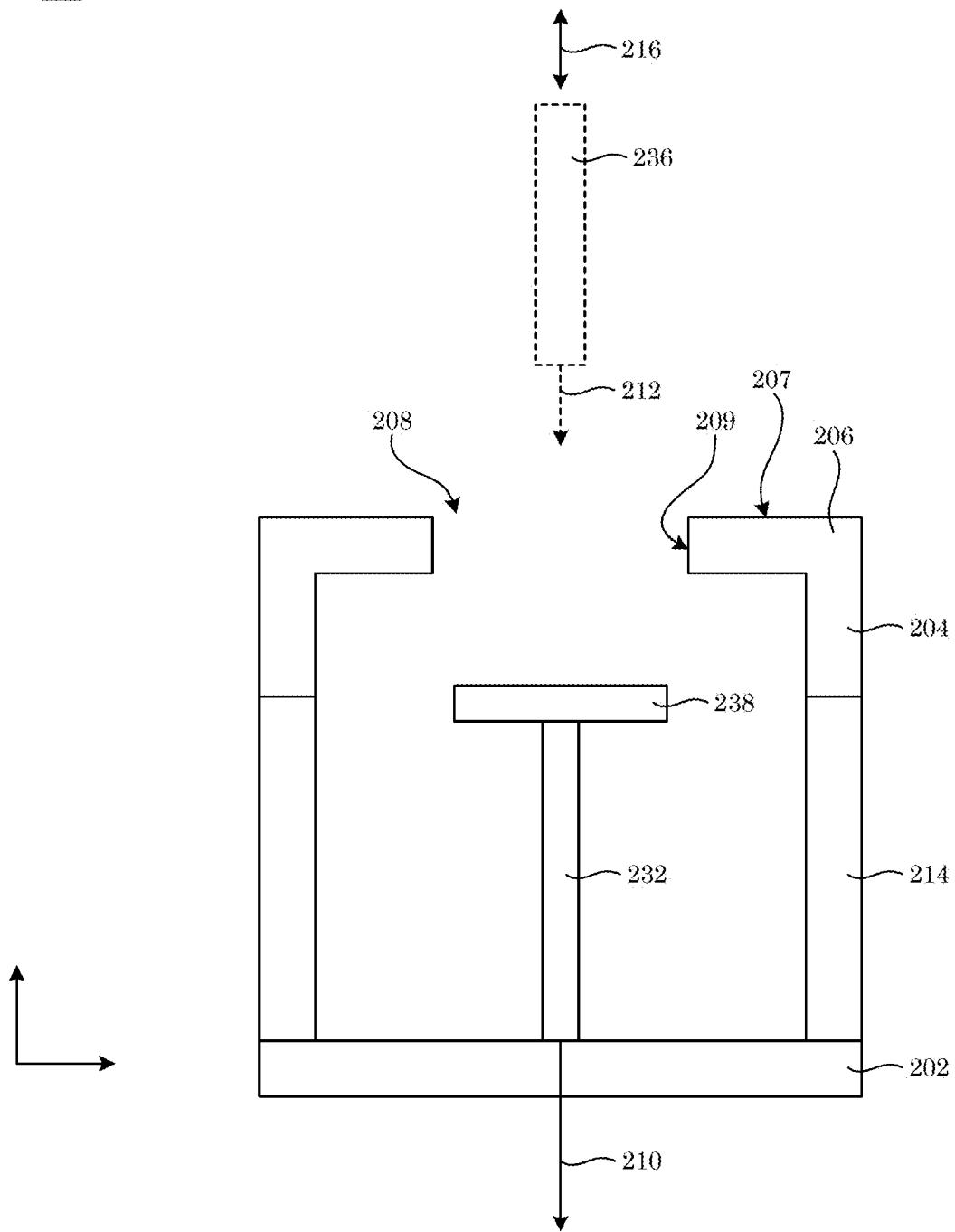
FIG. 4 shows a cross-section of the position verification sensor shown in FIG. 3.

A detailed description of one or more embodiments is presented herein by way of exemplification and not limitation.

It has been discovered that position verification sensor 200 herein includes compliant member 214 and that, when key 236 is presented to position verification sensor 200, position verification sensor 200 provides a binary output that depends on whether key 236 is presented within a selected tolerance of nominal value. Position verification sensor 200 and key 236 pairing provides verification of repeatable positioning of key 236 by a device, e.g., a robot, on which key 236 is attached.

It is contemplated that position verification sensor 200 and key 236 can be paired so that they interact in a very specific geometrical way, wherein target output 230 or null output 228 is produced by position verification sensor 200 based on the interaction. That is, when key 236 is presented by relative physically motion to provide interact with position verification sensor 200, the geometry and interaction between key 236 and position verification sensor 200 determine which output of position verification sensor 200 is produced. If key 236 is presented and positioned within a selected tolerance, position verification sensor 200 produces target output 230. Further, if key 236 is presented outside of the selected tolerance, position verification sensor 200 produces null output 228.

The industrial robotics industry has a need for more precise work cells, e.g., a robotics work cell, that include robots and surrounding equipment. During a lifetime of a conventional robot work cell, components can degrade and positioning of components can become less precise, wherein a relative position among components in repeated tasks can drift. Maintenance can conserve precision of robotic movements and can occur by replacement or recalibration of components. Therefore, there is a need to measure and track degradation of positioning precision, provided by position verification sensor 200. Advantageously, position verification sensor 200 provide a cost-effective and easy-to-integrate article for environments such as the manufacturing community, wherein position verification sensor 200 can be deployed or operated to detect changes in precision of positioning of components within a work cell.

Position verification sensor 200 produces a discrete output 210 for determining an accuracy of mutual mechanical positioning with a key 236. In an embodiment, with reference to FIG. 1, FIG. 2, FIG. 3, FIG. 4, and FIG. 15, position verification sensor 200 includes: substratum 202; housing 204 disposed on substratum 202; and receiver pad 238 disposed in housing 204. Receiver pad 238 receives contact with key 236 when key 236 is communicated through keyway aperture 208; produces target output 230 in response to contact with key 236; and produces null output 228 in absence of contact with key 236. Aperture cap 206 is disposed on housing 204 and includes: cap surface 207; and keyway aperture 208 disposed in aperture cap 206 and bounded by wall 209 of aperture cap 206. Keyway aperture 208 includes a shape and size selected to receive and selectively communicate key 236 through keyway aperture 208, such that aperture cap 206: selectively communicates key 236 through keyway aperture 208 to receiver pad 238 when key 236 and keyway aperture 208 are compatibly aligned; and receives key 236 on cap surface 207 when key 236 and keyway aperture 208 are incompatibly aligned so that: key 236 contacts cap surface 207 instead of being communicated through keyway aperture 208; and receives depression force 212 from key 236. Receiver pad 238 is interposed between substratum 202 and aperture cap 206. Compliant member 214 is interposed between substratum 202 and housing 204 through which substratum 202 and housing 204 are in mechanical communication. Compliant member 214 rests in primary position 218 in an absence of key 236 disposed on cap surface 207 of aperture cap 206; receives depression force 212 from aperture cap 206; reciprocatively depresses, from primary position 218 to depressed position 220, in response to receiving depression force 212 and being pushed by depression force 212 from key 236; and reciprocatively returns, from depressed position 220 to primary position 218, when key 236 is removed from contact with aperture cap 206.

Figure 11:
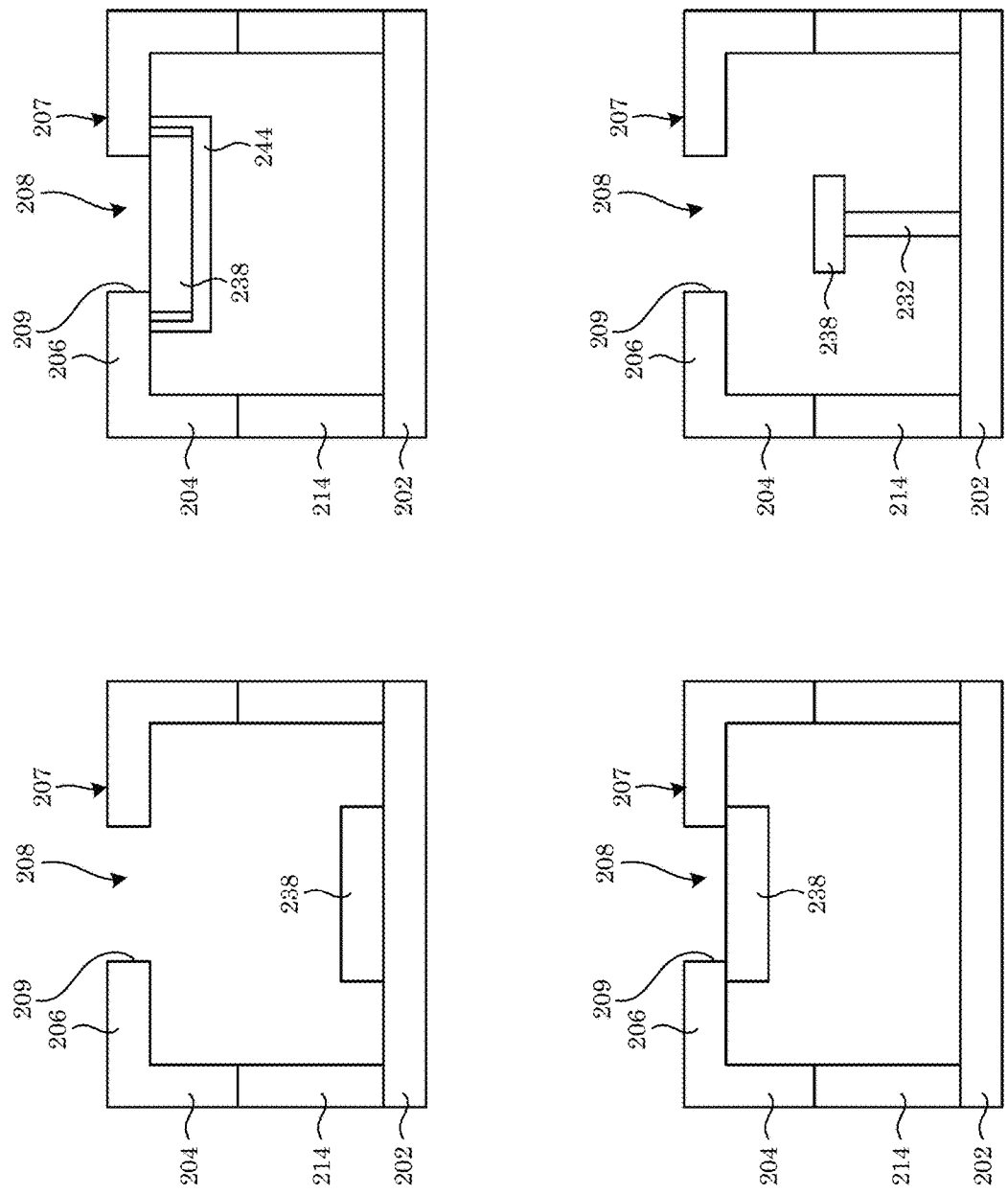
FIG. 11 shows a plurality a position verification sensors with different configurations of a receiver pad relative to an aperture cap.

In an embodiment, pad support 232 is mechanically interposed between receiver pad 238 and substratum 202. Pad support 232 depresses in response to contact of key 236 with receiver pad 238 so that receiver pad 238 can move away from or toward aperture cap 206 and substratum 202. In some embodiments, as shown in FIG. 11, receiver pad 238 is disposed on aperture cap 206 in an absence of pad support 232. It further is contemplated that movement of the pad support can be replaced with an electrical or optical interaction. For an optical interaction, a light beam can be intersected by the key or an optical sensor, e.g., an infrared sensor, can determine presence of the key when the key is communicated through the keyway aperture. According to an embodiment, the pad support does not depress, and, when the key contacts the receiver pad, a sensing circuit is closed showing a positive result, i.e., the key contacts the receiver pad. An additional depressive force can depress the compliant member if present, and the target output is produced in response.

Figure 5:
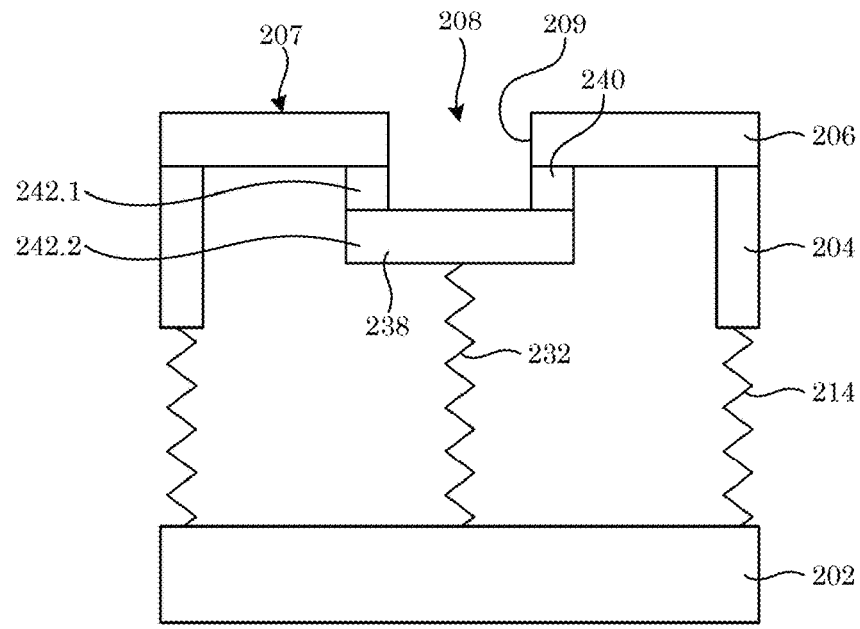
FIG. 5 shows a position verification sensor in a primary position in panel A and a depressed position in panel B.
Figure 5:
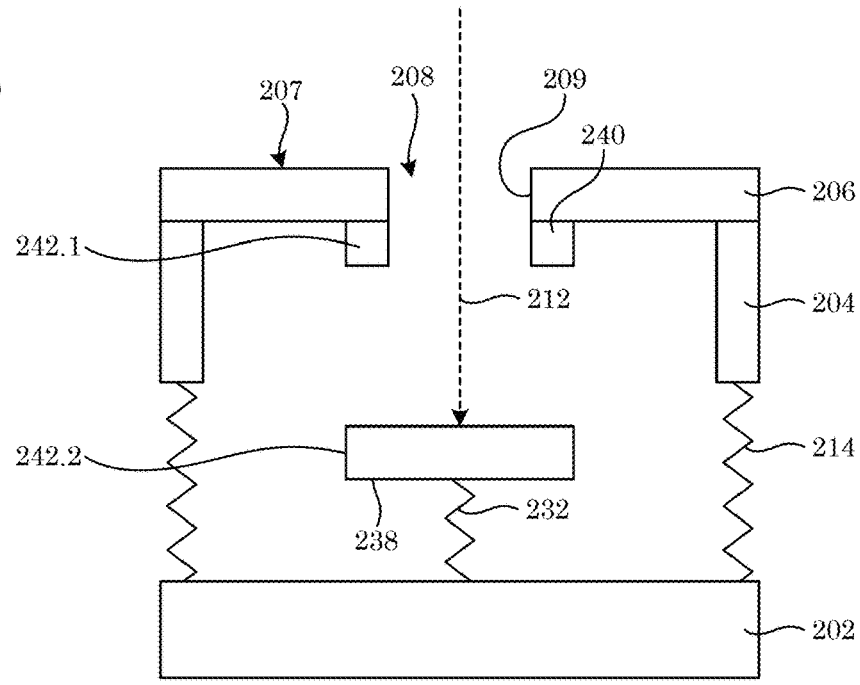

According to an embodiment, with reference to FIG. 5, position verification sensor 200 includes electrical contact 240 disposed on the aperture cap 206 and in electrical communication with the receiver pad 238. It is contemplated that position verification sensor 200 can include a plurality of electrical contact 240. In an embodiment, with reference to FIG. 6, position verification sensor 200 includes second electrical contact 240.2 disposed on the receiver pad 238 and in electrical communication with the electrical contact 240.1. Electrical conductor 242 can be in electrical communication with electrical contact 240 to provide an electrical path for detection of a position (e.g., primary position 218, depressed position 220) of aperture cap 206 relative to receiver pad 238 and substratum 202. Electrical conductors (242.1, 242.2) communicate a signal, e.g., null output 228 or target output 230, as a discrete output 210 that corresponds to state (e.g., null state 224 or target state 226) and position (e.g., primary position 218 or depressed position 220) of aperture cap 206 and receiver pad 238 in position verification sensor 200.

Position verification sensor 200 can include a nested configuration of aperture caps 206, receiver pads 238, housings 204, and compliant members 214. In an embodiment, with reference to FIG. 7 and FIG. 16, position verification sensor 200 includes second receiver pad 238.2 disposed on cap surface 207 of aperture cap 206, wherein aperture cap 206 is interposed between second receiver pad 238.2 and first receiver pad 238.1. Second receiver pad 238.2 can include second keyway aperture 208.2 that communicates key 236 through second keyway aperture 208.2 to aperture cap 206 when key 236 has a size and orientation that are compatible with a size and orientation of second keyway aperture 208.2. Second receiver pad 238.2 can receive contact with key 236 when key 236 is communicated through third keyway aperture 208.3 and when key 236 is not aligned with second keyway aperture 208.2; can produce second target output 230.2 in response to contact with key 236; and can produce second null output 228.2 in absence of contact with key 236. Second aperture cap 206.2 can be disposed over second receiver pad 238.2, wherein second receiver pad 238.2 is interposed between second aperture cap 206.2 and aperture cap 206. Second aperture cap 206.2 can be disposed on second housing 204.2. Second aperture cap 206.2 can include second cap surface 207.2; and third keyway aperture 208.3 disposed in second aperture cap 206.2 and bounded by second wall 209.2 of second aperture cap 206.2. Third keyway aperture 208.3 includes a shape and size selected to receive and selectively communicate key 236 through third keyway aperture 208.3. In this configuration, second aperture cap 206.2 selectively communicates key 236 through third keyway aperture 208.3 to second receiver pad 238.2 when key 236 and third keyway aperture 208.3 are compatibly aligned; and receives key 236 on second cap surface 207.2 when key 236 and third keyway aperture 208.3 are incompatibly aligned so that: key 236 contacts second cap surface 207.2 instead of being communicated through third keyway aperture 208.3 and receives depression force 212 from key 236. Second housing 204.2 is disposed on substratum 202 and in which second receiver pad 238.2 and receiver pad 238 are disposed; and on which second aperture cap 206 is disposed. Second compliant member 214.2 is interposed between substratum 202 and second housing 204.2 and is through which substratum 202 and second housing 204.2 are in mechanical communication. Second compliant member 214.2 rests in second primary position 218.2 in an absence of key 236 disposed on second cap surface 207.2 of second aperture cap 206; receives depression force 212 from second aperture cap 206.2; reciprocatively depresses, from second primary position 218.2 to second depressed position 220.2, in response to receiving depression force 212 and being pushed by depression force 212 from key 236; and reciprocatively returns, from second depressed position 220.2 to second primary position 218.2, when key 236 is removed from contact with second aperture cap 206.2.

Figure 8:
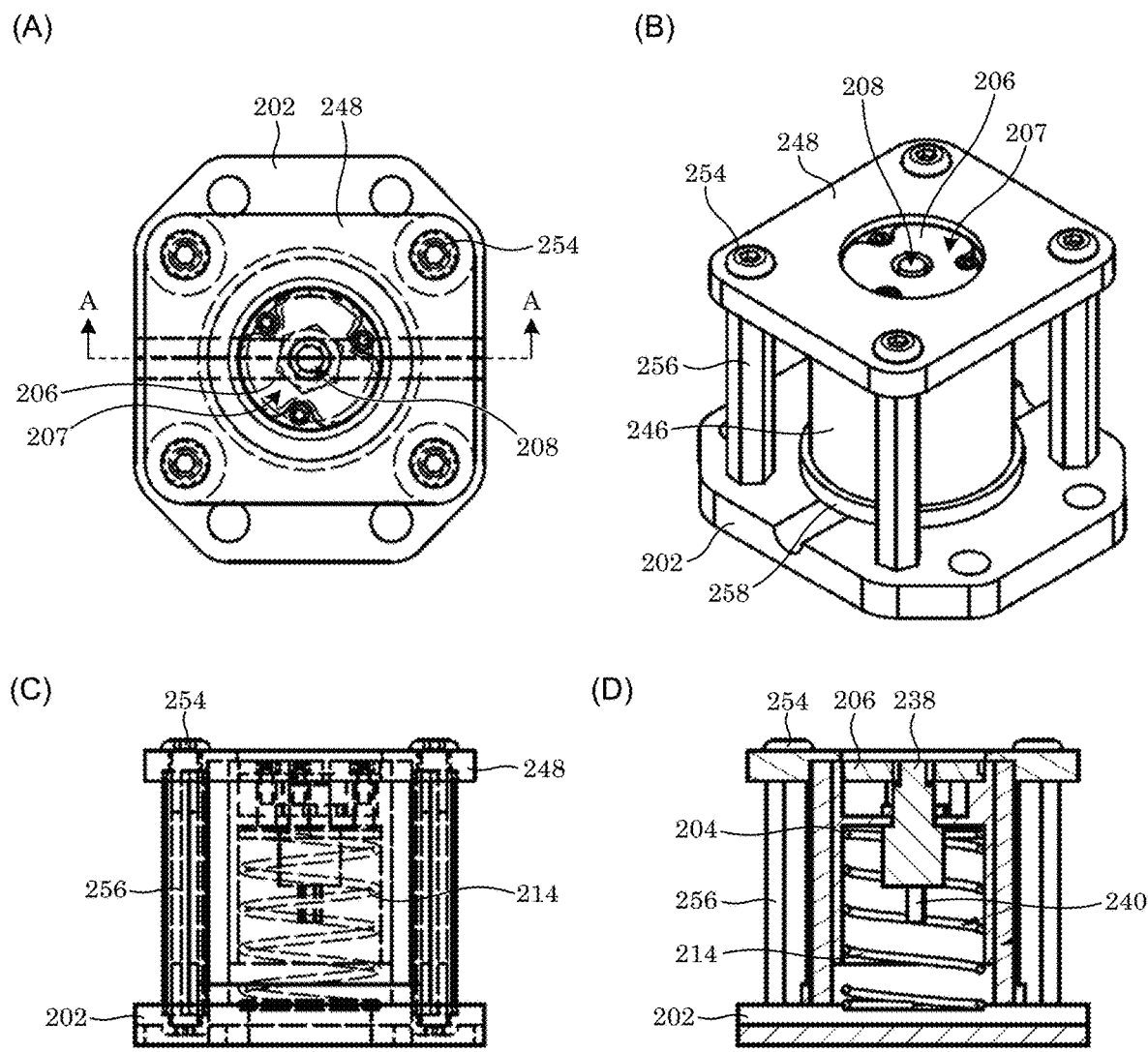
FIG. 8 shows a position verification sensor in plan view (panel A), perspective view (panel B), side view (panel C), and cutaway view (panel D)
Figure 9:
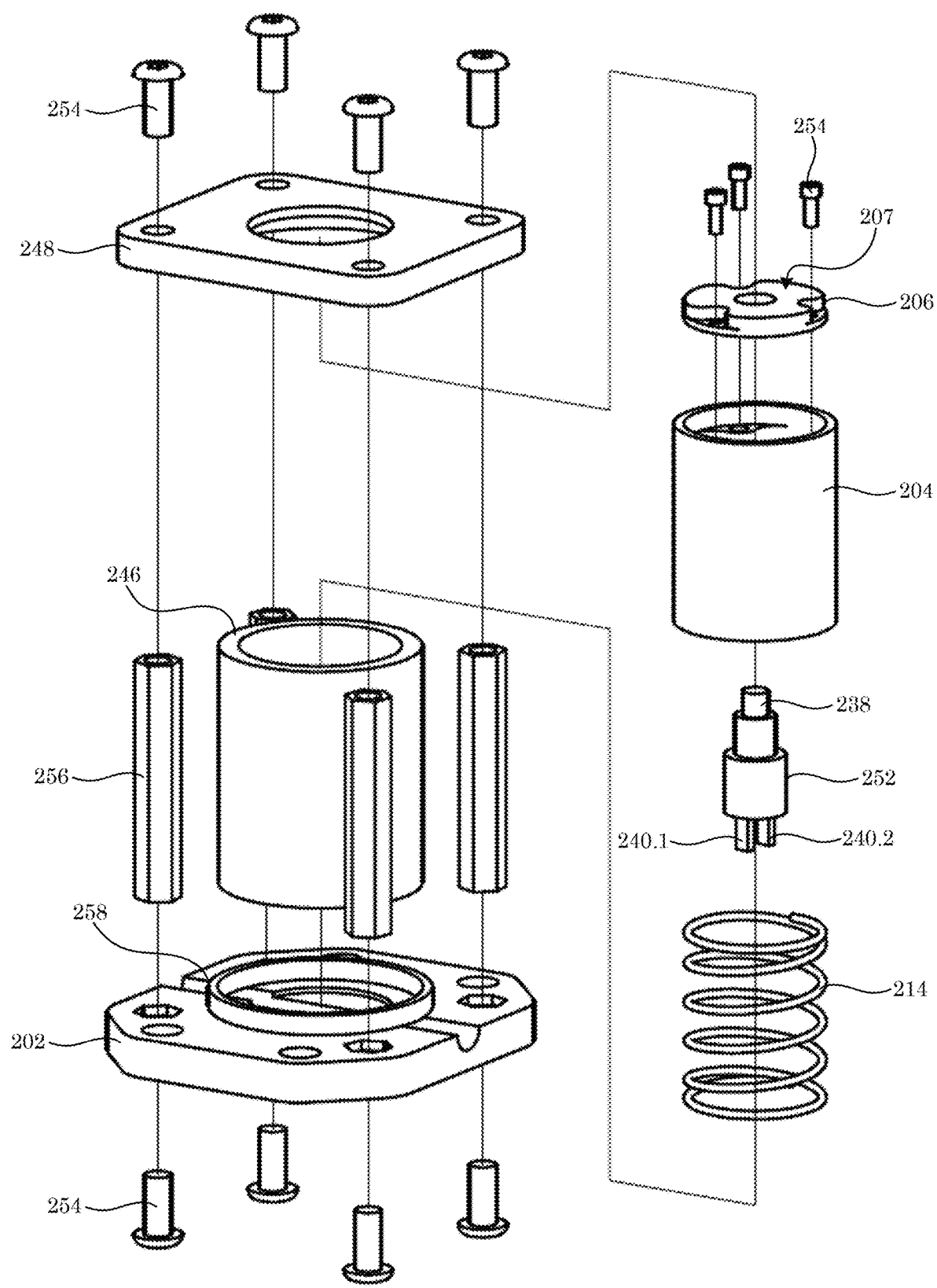
FIG. 9 shows an exploded view of the position verification sensor shown in FIG. 8.
Figure 10:
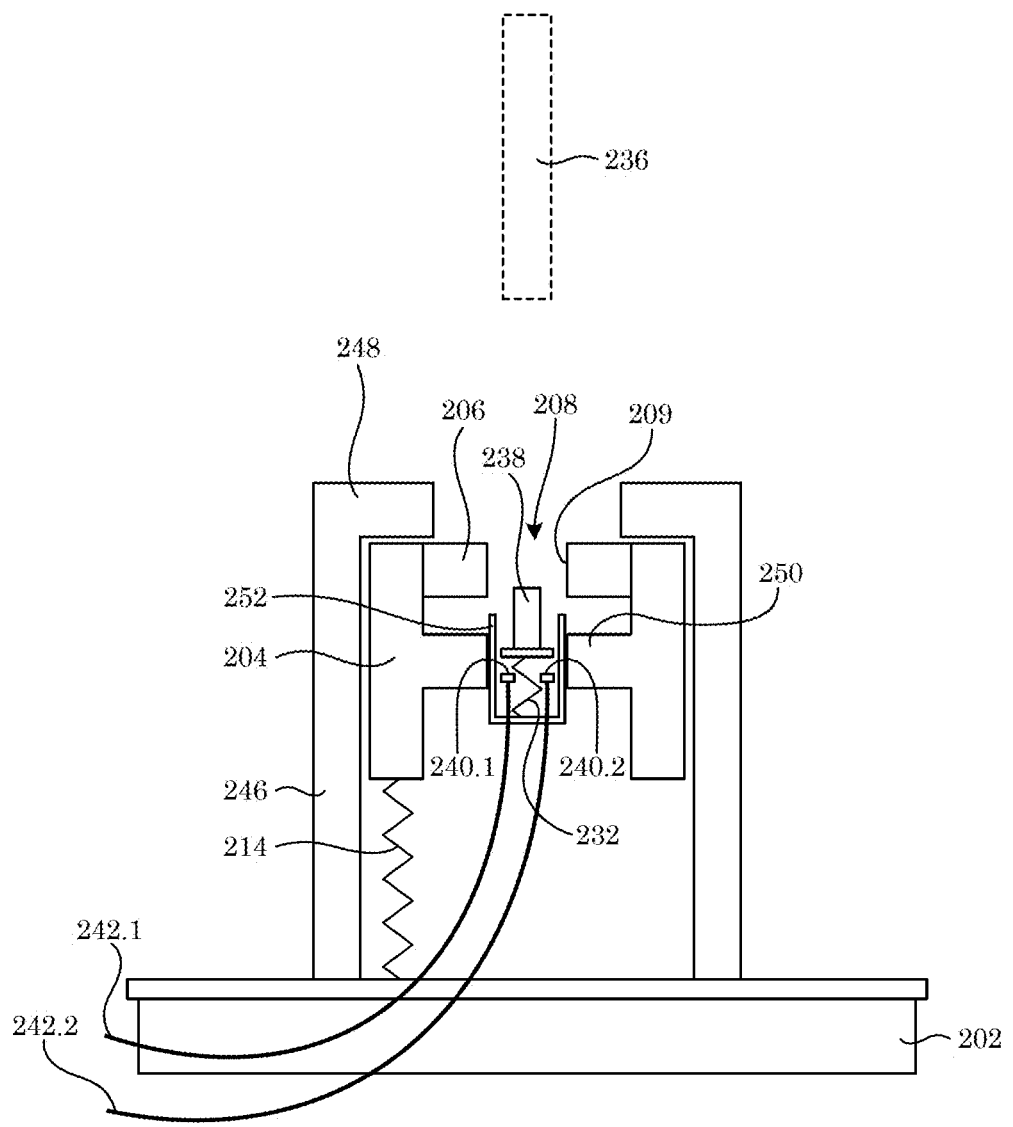
FIG. 10 shows a position verification sensor with a button switch as a receiver pad.

With reference to FIG. 8, FIG. 9, and FIG. 10, position verification sensor 200 can include various other features including, e.g., body 246 disposed around housing 204 and receiver pad 238. Body 246 can be disposed between substratum 202 and body cap 248 that can be separated by spacer 256 and mechanically coupled with fastener 254. Aligner 258 can be disposed on substratum 202 to align components of position verification sensor 200.

In position verification sensor 200, substratum 202 provides a supporting structure for disposition of other elements thereon. It is contemplated that substratum 202 can include aligner 258 to bound body 246, which can be a flat surface upon which body 246 is disposed and holes to enable mechanical connection to spacer 256. Exemplary substrata 202 include metal, polymer, glass, and the like. Moreover, substrata can be fabricated within tolerances to provide a selected level of measurement precision. Dimensions of substrata include a diameter of aligner 258, diameter of holes to mechanically couple spacers, flatness of bottom face of substrata, and flatness of surface that body 246 rests. A size, e.g., a largest linear dimension of substratum 202, can be selected for a particular application such as several microns to meters. In an embodiment with reference to FIG. 9, substratum 202 includes aligner 258 to bound body 246, a bottom flat surface, a flat surface which body 246 rests, holes to mechanically couple spacer 256, and holes to mechanically couple the substratum 202 to an external surface for practical use.

Body 246 can include an external surface to protect sensor 200 components from environmental forces such as moisture, dust, and debris; internal surface to encapsulate and appropriately constrain internal elements of sensor 200; bottom surface to mechanically rest on substratum 202, and top surface to mechanically receive body cap 248. Exemplary bodies 246 include metal, polymer, glass, and the like. Moreover, body 246 can have a low internal friction to provide unobstructed movement of housing 204. The outer diameter of body 246 should be nominally smaller than the inner dimension of aligner 258 so that the body 246 is firmly constrained in X and Y directions. The inner diameter of body 246 can be larger than the outer diameter of housing 204 such that housing 204 can move in a Z-direction but not move in X- or Y-directions in a Cartesian frame. In an embodiment with reference to FIG. 9, body 246 is a machined plastic cylinder that has an outer diameter nominally smaller than the aligner 258; has an inner diameter that is larger than the outer diameter of housing 204 enabling housing 204 to move in the Z-direction based upon depression force 212; and is mechanically constrained by substratum 202 and body cap 248.

Housing 204 can include an external surface such that it can be reasonably constrained by body 246; a downward facing surface that is in mechanical communication with compliant member 214; provides a hole or surface for mechanically coupling to switch housing 252; provides a surface for mechanical communication with aperture cap 206; and provides a mechanical coupling to aperture cap 206. Exemplary housings 204 include metal, polymer, glass, and the like. Moreover, housing 204 can have a smooth outer diameter surface so that Z movement of housing 204 within body 246 is not hindered frictionally and can have dimensional tolerances that provides minimal X or Y movement during operation. In an embodiment with reference to FIG.

9, housing 204 is machined stainless steel; includes an outer diameter that is nominally smaller than the inner diameter of body 246; an outer surface that has a relatively low surface roughness to promote low friction and smooth Z movement with body 246; a hole or surface to mechanically constrain switch housing 252; a surface to mechanically contact aperture cap 206; and machined holes to appropriately accept fasteners 254 to mechanically bind aperture cap 206 to housing 204.

Figure 12:
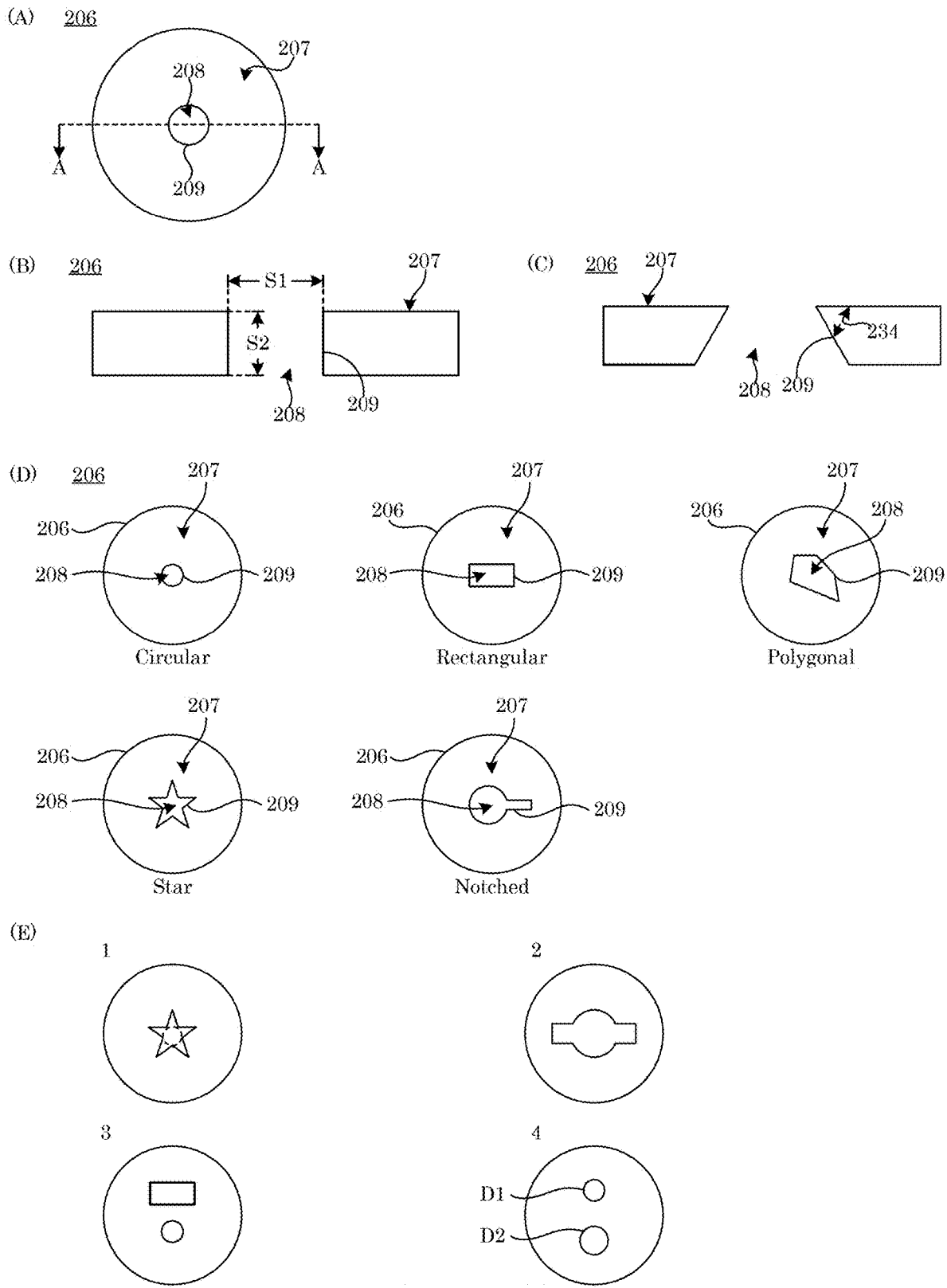
FIG. 12 shows (A) an aperture cap in top view, (B) a cross-section along line A-A shown in panel A for an embodiment of the aperture cap, (C) a cross-section along line A-A shown in panel A for another embodiment of the aperture cap, and (D) a plurality of an aperture caps with different shapes of a keyway aperture.

Aperture cap 206 is disposed on housing 204 and includes cap surface 207 and keyway aperture 208. Aperture cap 206 can include a material such as a metal, polymer, glass, and the like. It is contemplated that aperture cap 206 can accept a plurality of contacts with key 236. In this respect, aperture cap 206 can have a hardness selected to withstand contact with key 236 in an absence of deformation of aperture cap 206 to avoid artificial movement of receiver pad 238 in lieu of direct contact by key 236. Moreover, aperture cap 206 can have a shape and size for use in a work cell, including those that involve robotics. With reference to panel B of FIG. 12, a first size D1 of keyway aperture 208 can be some dimension larger than the dimension of key 236. A second size D2 of keyway aperture 208 can be some dimension identical to or smaller than dimension of first size D1. Moreover, with reference to panel C, aperture cap 206 can include bevel angle 234 for keyway aperture 208 with respect to cap surface 207. Bevel angle 234 can be between 0 and 180 degrees. It is contemplated that keyway aperture 208 can have a shape that constrains key 236 to a particular angle, size, orientation, and the like for alignment to keyway aperture 208 so that key 236 can be communicated through keyway aperture 208 if key 236 and keyway aperture 208 compatibly aligned. Otherwise, key 236 is intercepted by cap surface 207 and not communicated through keyway aperture 208 so that key 236 cannot contact receiver pad 238. Exemplary shapes for keyway aperture 208 are shown in panel D of FIG. 12. An aperture cap 206 can include a plurality of keyway apertures 208, wherein keyway apertures independently can include a shape, e.g., a shape shown in panel D of FIG. 12. As shown in panel E of FIG. 13, a plurality of keyway apertures 208 can be disposed such that a plurality of keys, having a same or different shape, can be tested or a key that includes a combination geometry (e.g., a square cross-sectional shape in one portion of the key and a circular cross-section at another portion of the key) can be tested. Also shown in panel E of FIG. 12, keyway apertures 208 can be disposed in aperture cap 206, wherein keyway apertures 208 have the same geometry and different dimensions. Key 236 can interact with keyway apertures 208 to with null output or target output being produces. In an embodiment with reference to FIG. 9, keyway aperture 208 has a round shape with bevel angle 234 of 90° and is made from machined stainless steel. In an embodiment with reference to FIG. 32, a plurality of receiver pads 238 provides a plurality of aperture caps 206 such that the number of aperture caps 206 is equal to the number of receiver pads 238.

Figure 13:
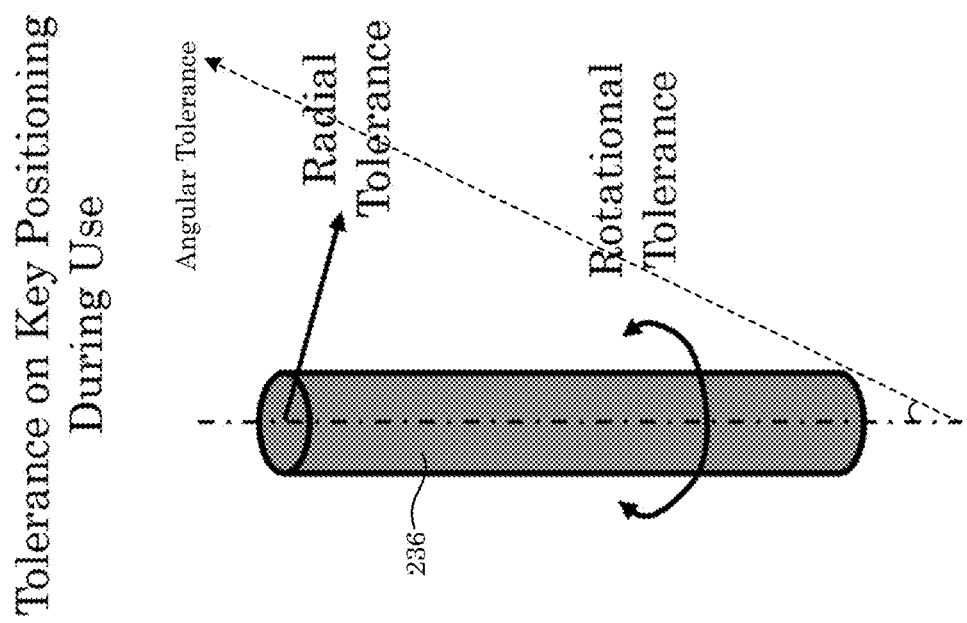
FIG. 13 shows a layout of elements of a position verification sensor relative to a key and radial and rotational tolerance with respect to the key.
Figure 13:
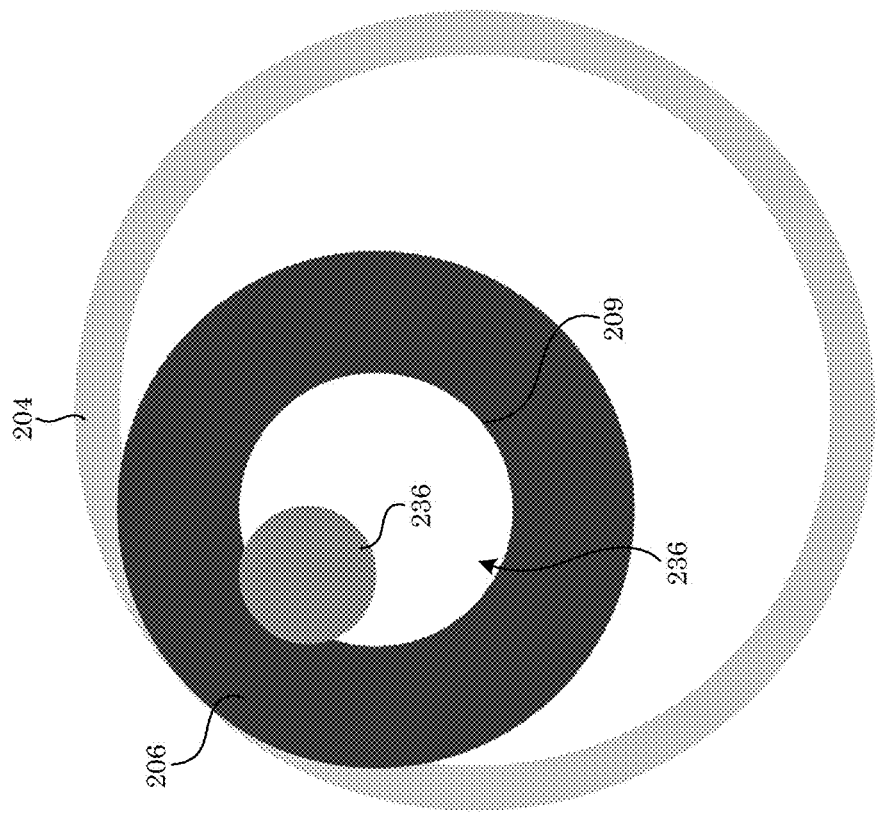
Figure 14:
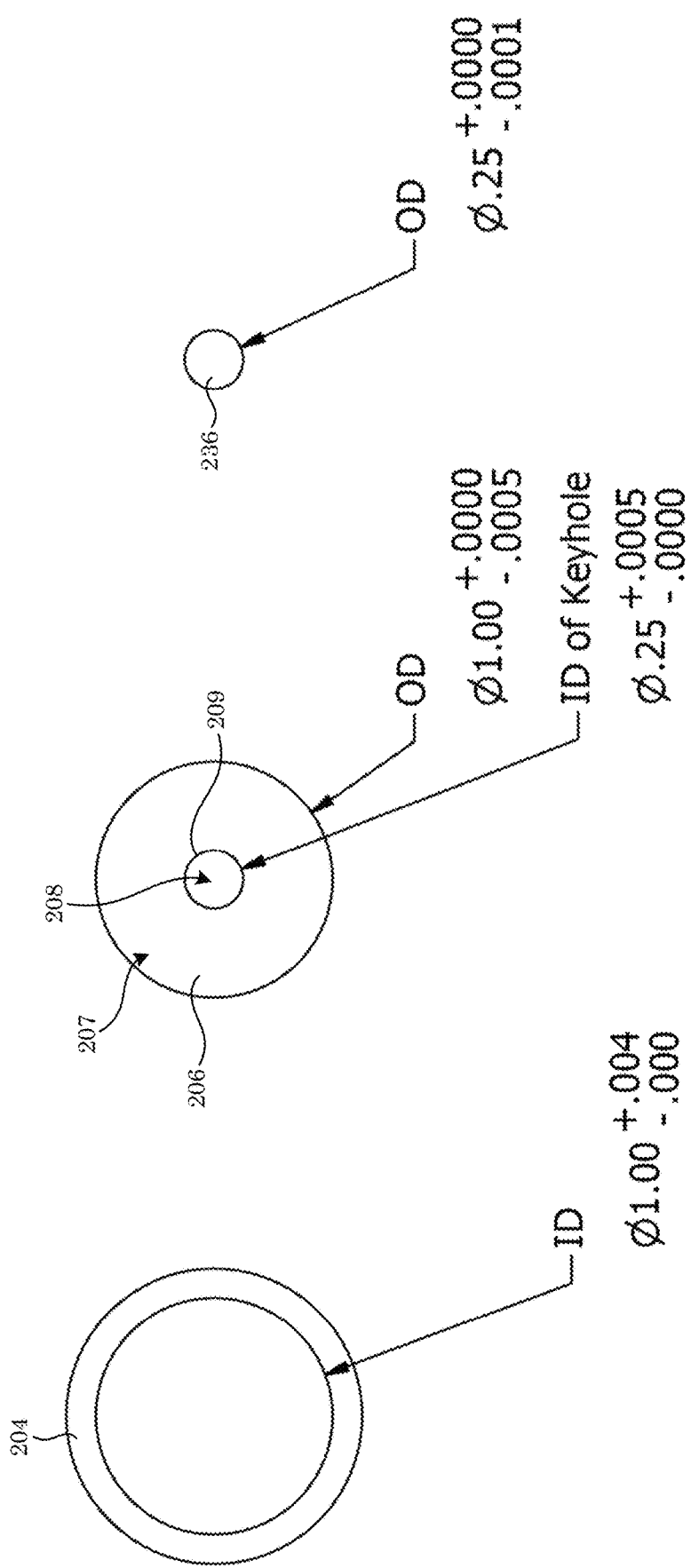
FIG. 14 shows exemplary tolerances for elements of a position verification sensor.

Aspects of tolerance, e.g., radial tolerance, rotational tolerance, and the like of key 236 with respect to aperture cap 206 and housing 204 are shown in FIG. 13 and FIG. 14. It is contemplated that a safety factor SF (e.g., $SF=F_{fail}/F_{allow}$, wherein $F_{fail}$ is a failure limit, and $F_{allow}$ is an allowable limit such that if a radial tolerance is 100 cm+/−1 cm, SF=50) with respect to tolerance of key 236 to keyway aperture 208 can be from 0.5 TO 10000 or an intermediate value thereof or a value selected for a particular technological application for determining an accuracy of disposal of key 236 into keyway aperture 208. In this regard, the tolerance can include a radial tolerance, rotational tolerance, angular tolerance, or a combination thereof.

Figure 15:
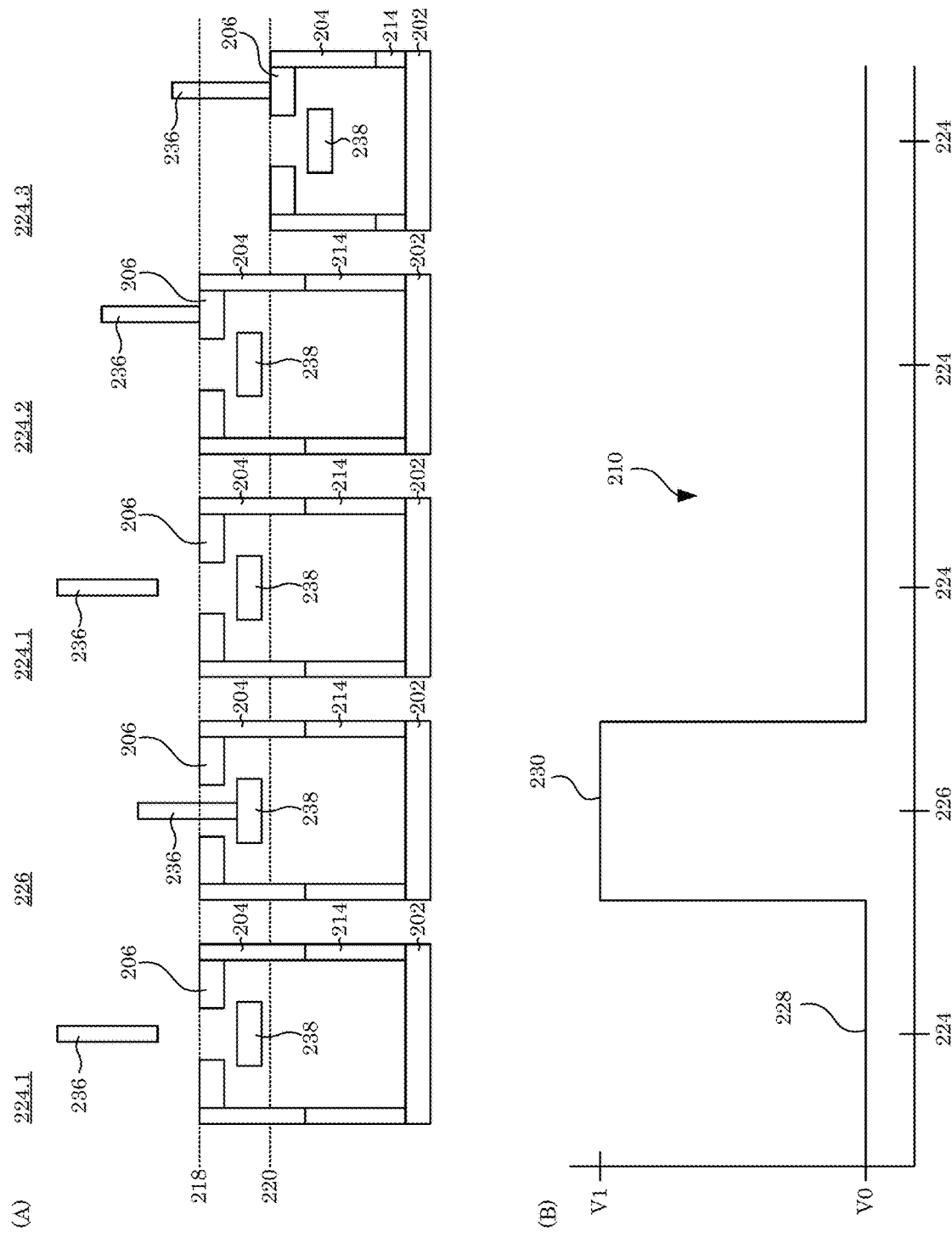
FIG. 15 shows (A) a plurality of relative positions of a key with respect to a position verification sensor and (B) corresponding exemplary null output and target output for the position verification sensor.
Figure 16:
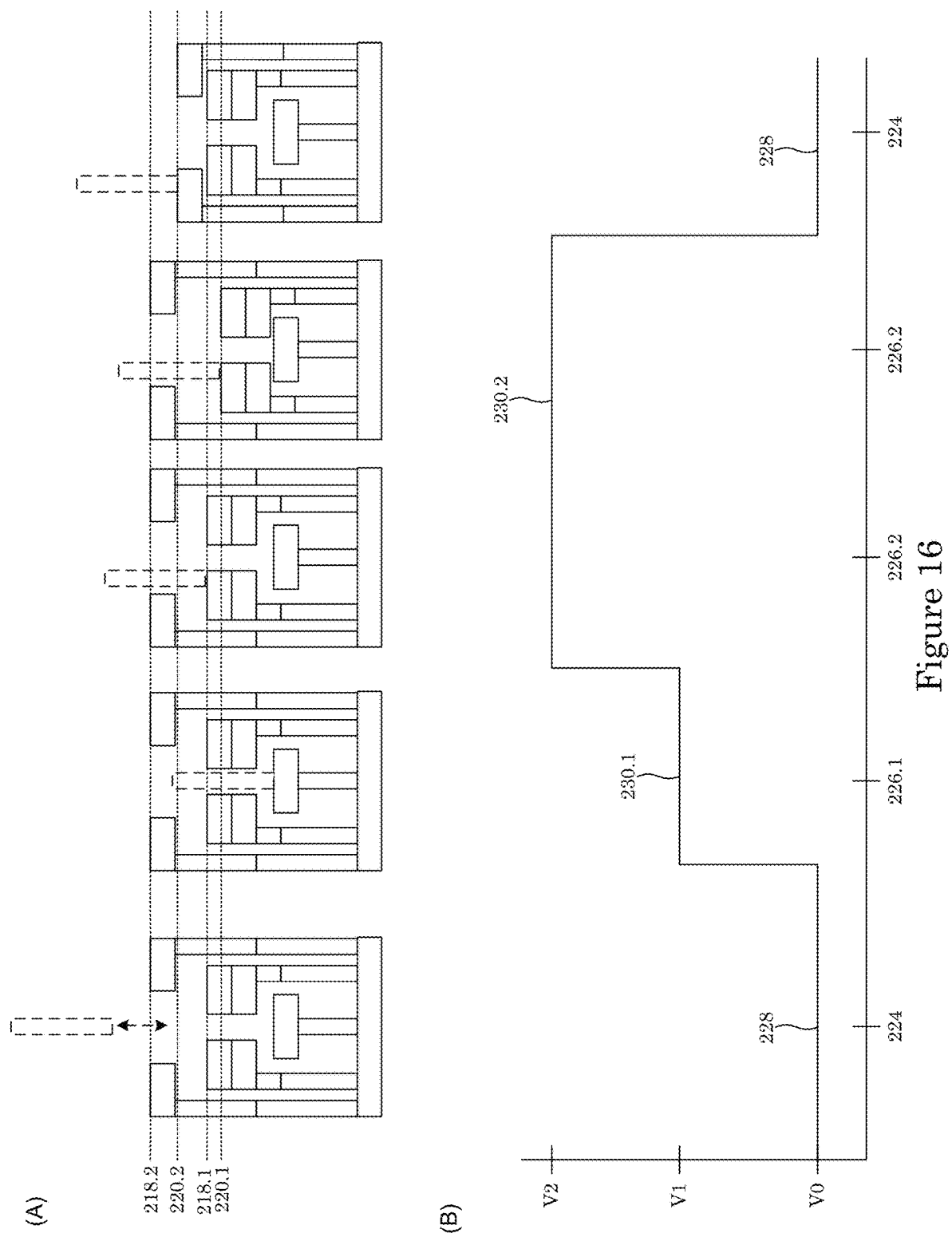
FIG. 16 shows (A) a plurality of relative positions of a key with respect to a position verification sensor and (B) corresponding exemplary null output and target output for the position verification sensor.

With reference to FIG. 15 and FIG. 16, position verification sensor 200 produces discrete output 210 as a function of contact between key 236 with aperture cap 206 or receiver pad 238. With key 236 not in contact with position verification sensor 200, aperture cap 206 is in primary position 218 so that position verification sensor 200 has null state 224 and produces null output 228 as discrete output 210. It is contemplated that discrete output 210 can be an electrical response where a change in signal indicates a change from a null output to a target output; a mechanical response where a mechanical motion, physical connection, or lack thereof indicate a change from a null output to a target output; or an optical response resultant from the presence of key 236 encapsulated or through keyway aperture 238. Exemplary discrete outputs 210 include an electrical signal, mechanical response, optical signal, or a combination thereof. The electrical signal can be a selected voltage or current. The mechanical response can be a movement or positioning of a physical member. The optical signal can be a change in signal measured, e.g., from an optical device. Further, null output 228 can include an absence or presence of an electrical signal, mechanical response, or optical signal. When key 236 is communicated through keyway aperture 208 and contacts receiver pad 238, aperture cap 206 can remain in primary position 218 with position verification sensor 200 transitioning from null state 224 to target state 226 so that position verification sensor 200 produces target output 230 as discrete output 210. Further, target output 230 can include an electrical signal, mechanical response, and optical signal. When key 236 moves out of contact from receiver pad 238 or aperture cap 206, position verification sensor 200 is in null state 224 with discrete output 210 being null output 228. When key 236 contacts cap surface 207 and depresses aperture cap 206 by depression force 212, aperture cap 206 moves and compresses compliant member 214 so that position verification sensor 200 maintains null state 224 with null output 228.

Figure 7:
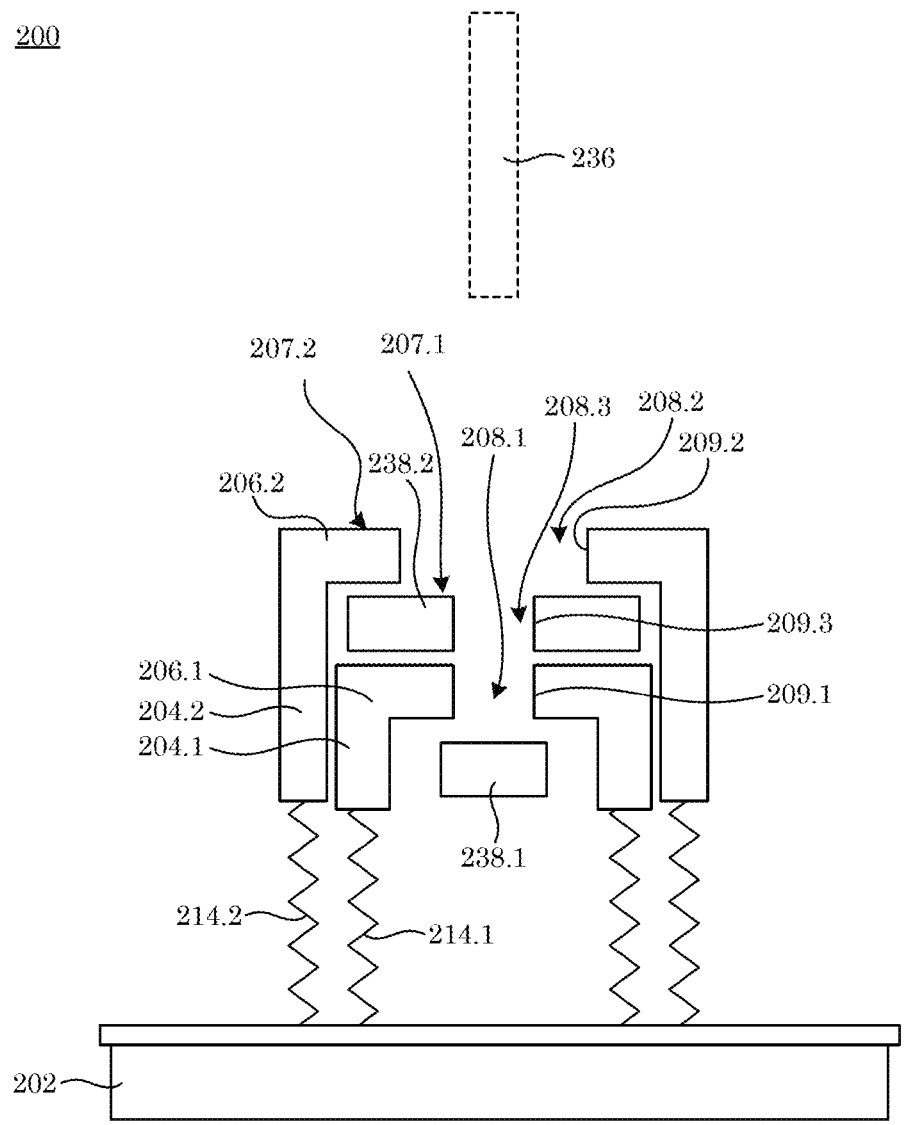
FIG. 7 shows a position verification sensor with a plurality of receiver pads.

For nested or stacked receiver pads 238, e.g., as shown in FIG. 7 with reference to FIG. 16, a plurality of depressed positions (220.1, 220.2, and the like) or primary positions (e.g., 218.1, 218.2, and the like) can occur with a plurality of target outputs (e.g., 230.1, 230.2, and the like).

Compliant member 214 provides displacement motion of aperture cap 206 and housing 204 relative to substratum 202 or receiver pad 238.

It is contemplated that the receiver pad is disposed in housing 204 such that, when the receiver pad is subject to pressure from key 236, the receiver pad maintains compliance via compliant member 214 such that depressive force 212 of key 236 does not break receiver pad 238. In an embodiment, receiver pad 238 is directly disposed on substratum 202 so that displacement of receiver pad 238 is less than displacement of key 236 in contact with receiver pad 238. Compliant member 214 can include a material having a selected spring force constant such as a spring or other elastically or inelastically deformable material including foam. Exemplary compliant members 214 include metal, polymer, and the like. Moreover, the geometry of the spring coils may be uniform, non-uniform, and the like. In an embodiment, compliant member 214 includes a metal spring made up of a stainless steel cylindrical coil; a coil diameter that is less than the inner diameter of housing 204 such that the lower surface of compliant member 214 mechanically contacts the top surface of substratum 202 and the upper surface of compliant member 214 mechanically contacts the internal surface of housing 204 and compliant member 214 surrounds switch housing 252 and may not contact switch housing 252.

It is contemplated that aperture cap 206 or receiver pad 238 move in reciprocation direction 216 between primary position 218 and depressed position 220. Reciprocation direction 216 can be linear, non-linear, rotary, diagonal, or a selected trajectory path with respect to keyway aperture 208. Moreover, reciprocation direction 216 can be achieved through velocities that are constant, linear, non-linear, and the like; can be achieved through accelerations that are constant, linear, non-linear, and the like.

With reference to FIG. 1, FIG. 2, FIG. 4, FIG. 5, FIG. 6, and FIG. 11, pad support 232 is disposed on substratum 202 and receiver pad 238 is disposed on pad support 232. It is contemplated that pad support 232 can include a compliant member that moves according to depression force 212 in mechanical communication with receiver pad 282 where receiver pad 238 would return to its original state, position, or orientation upon removal of depression force 212 from receiver pad 238. Exemplary pad support 232 include metal, polymer, and the like.

With reference FIG. 1, FIG. 4, FIG. 7, FIG. 10, and FIG. 15, key 236 presents a physical geometry to keyway aperture 208 such that key 236 moves in reciprocation direction 216, wherein key 236 applies depression force 212 on receiver pad 238 to achieve target state 226 or key 236 applies depression force 212 on cap surface 207 yielding null state 224. It is contemplated that key 236 includes, e.g., a geometry shown in panel D or E of FIG. 12. Exemplary key 236 include metal, polymer, glass, and the like. Moreover, key 236 can have dimensions that is less than or equal to that of keyway aperture 208. With a plurality of keyway apertures, the cross-sectional dimension of key 236 can be equal to or less than the dimension of any keyway aperture. In an embodiment, key 236 is a metal cylindrical pin with a length of one inch and a diameter of 0.250 inches.

In position verification sensor 200, receiver pad 238 receives mechanical contact from key 236 through depression force 212 if key 236 communicates through keyway aperture 208. Mechanical communication between receiver pad 238 and key 236 produce target state 226 resulting in target output 230. It is contemplated that receiver pad 238 can include an electrical contact or a surface for mechanical coupling. Exemplary receiver pad 238 include metal, polymer, and the like. In an embodiment, as shown in FIG. 9, receiver pad 238 is a push button switch that is mechanically coupled to switch housing 252; is connected to electrical contacts 240.1 and 240.2; mechanically coupled to housing 204; directly below keyway aperture 208 of aperture cap 206; produces a target output 230 when key 236 applies depression force 212 to receiver pad 238 and a null output 228 when key 236 does not apply depression force 212 to receiver pad 238.

Figure 6:
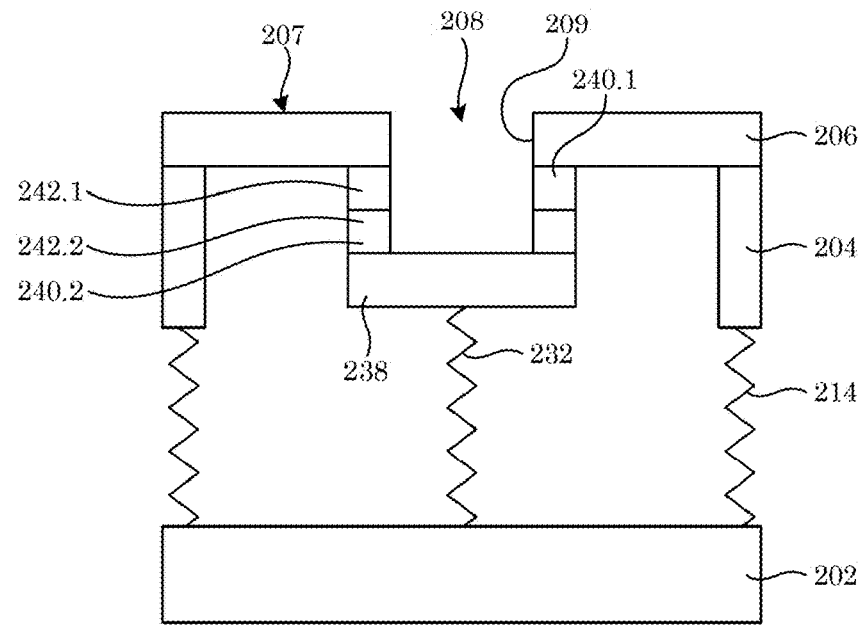
FIG. 6 shows a position verification sensor in a primary position in panel A and a depressed position in panel B.
Figure 6:
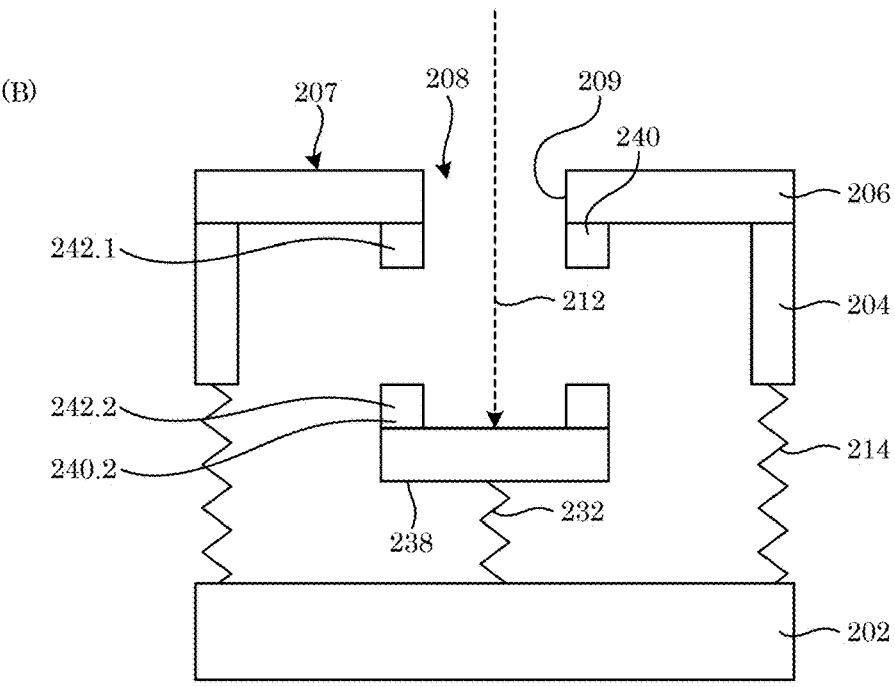
Figure 17:
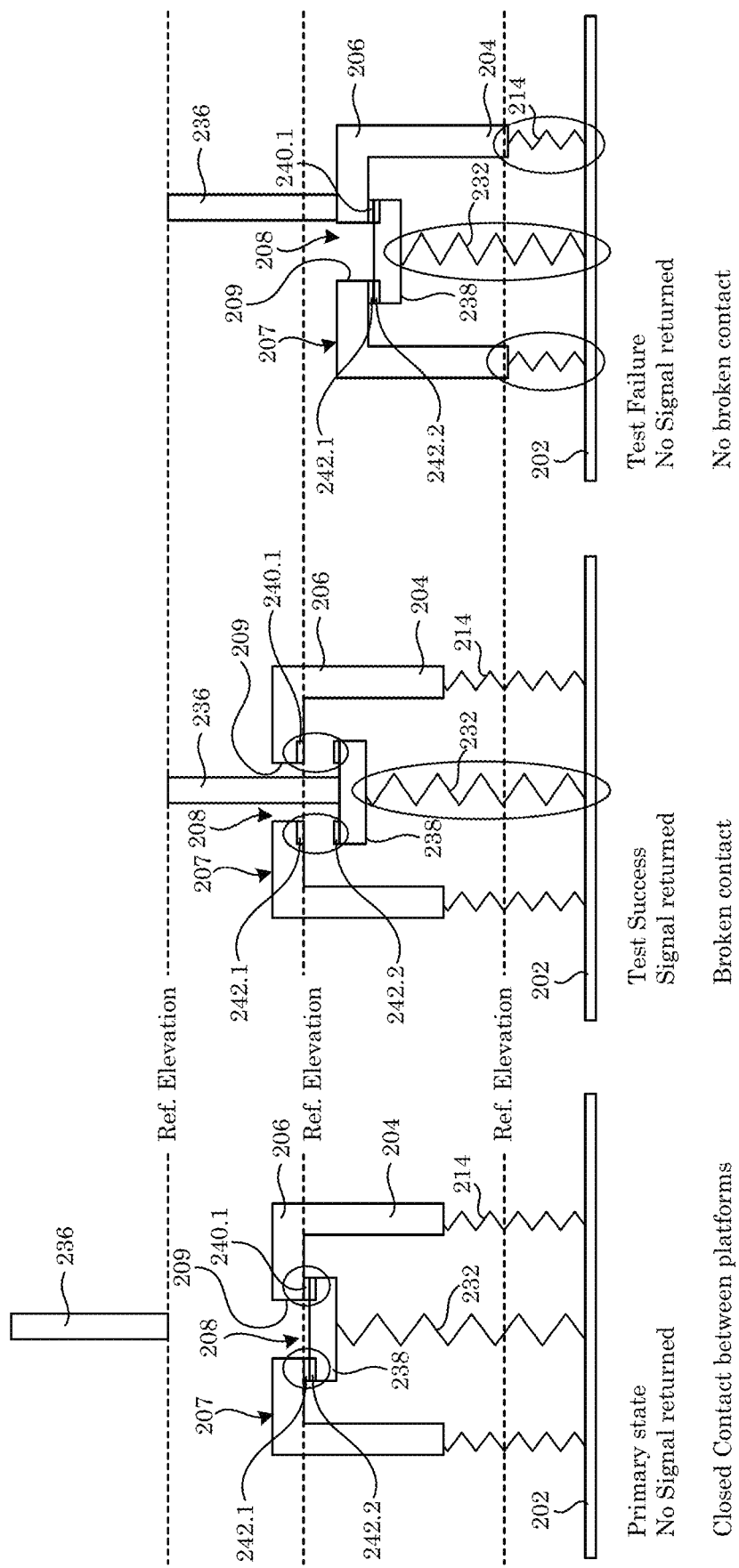
FIG. 17 shows a plurality of mutual mechanical positioning of a key relative to a position verification sensor.
Figure 18:
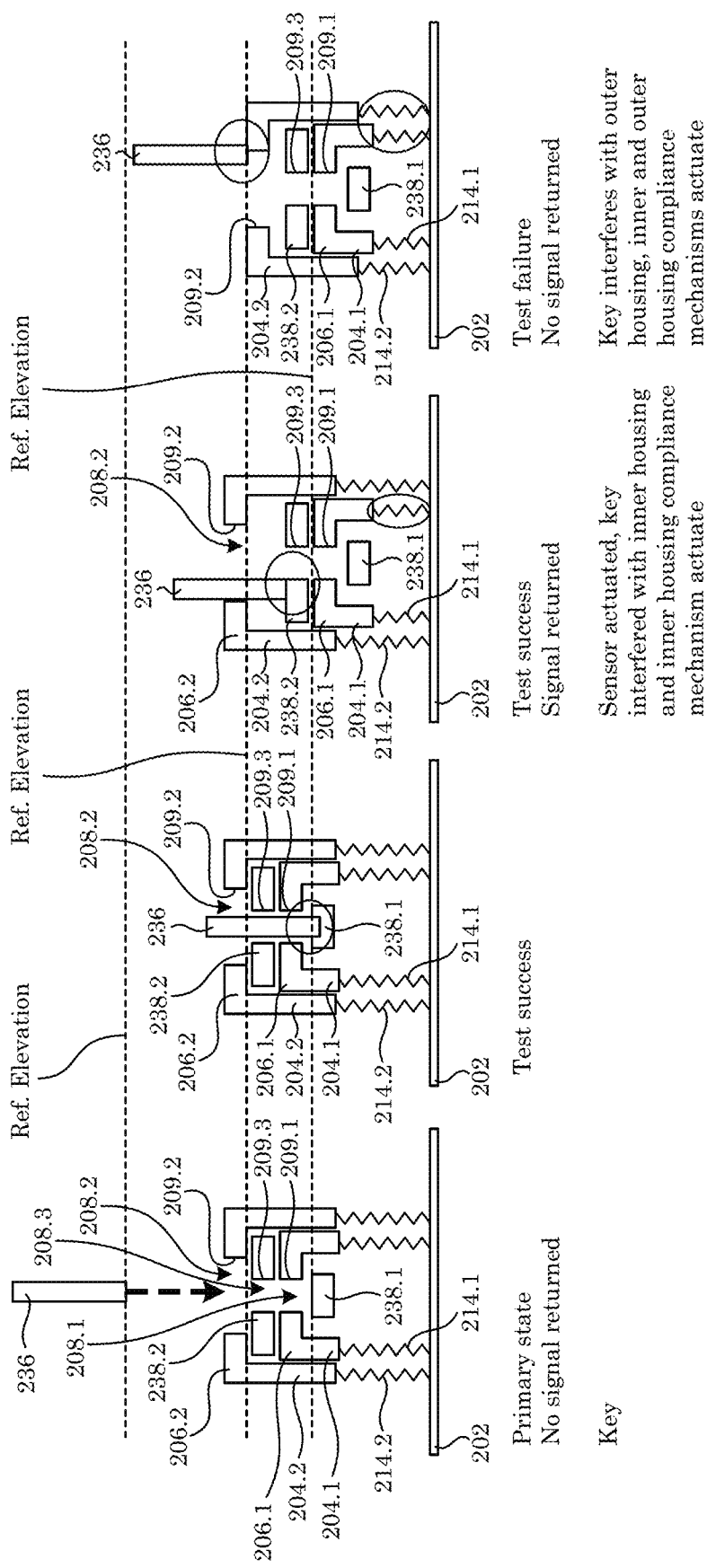
FIG. 18 shows a plurality of mutual mechanical positioning of a key relative to a position verification sensor.

In FIG. 5, FIG. 6, and FIG. 17, electrical contact 240 is disposed on receiver pad 238 and remains in contact with aperture cap 206 or second electrical contact 240.2 that is disposed on aperture cap 206 and yields null state 224 producing null output 228. When receiver pad 238 receives depression force 212, electrical contact 240 loses mechanical communication from aperture cap 206 or electrical contact 240.2 thereby producing target state 226 thus generating target output 230. Exemplary electrical contact 240 include metal and the like. Electrical contact 240 provides sufficient electrical conductivity so that position verification sensor 200 produces null output 228 and target output 230.

In an embodiment in reference to FIG. 5, FIG. 6, and FIG. 17, electrical contact 240 is a metal washer that is in mechanical communication with electrical contact 240.2, also a metal washer. In an embodiment, when depression force 212 is applied to receiver pad 238, electrical contact 240 loses mechanical communication with 240.2 thereby producing a target output in the form of opening an electrical circuit.

In position verification sensor 200 in FIG. 5, FIG. 6, electrical conductor 242 transmits null output 228 and target output 230 according the presence or absence of depression force 212 on receiver pad 238 and receipt of depression force 212 by receiver pad 238. A plurality of electrical conductors 242 in presence of a plurality of receiver pads 238 can include a plurality of target outputs 230. Exemplary electrical conductors 242 include metal and the like. Moreover, electrical conductor can include sufficient electrical conductivity to communicate null output 228 and target output 230. In an embodiment, electrical conductor 242 are comprised of electrical conductor 242.1 and electrical conductor 242.2; electrical conductor 242.1 is in mechanical communication with electrical contact 240.1; electrical conductor 242.2 is in mechanical communication with electrical contact 240.2; electrical conductor 242.1 and electrical conductor 242.2 present an open 8V DC circuit when receiver pad 238 is not in mechanical communication with depression force 212; electrical conductor 242.1 and electrical conductor 242.2 present a closed 8V DC circuit when receiver pad is in mechanical communication with depression force 212. In an embodiment with a plurality of receiver pads 238, there is a plurality of electrical conductor 242.1 and electrical conductor 242.2.

Retainer 244 can be disposed on aperture can 206 opposing cap surface 207 to retain receiver pad 238 on aperture cap 206. In reference to FIG. 9, body cap 248 is in mechanical communication with body 246 and spacers 256, and mechanically fastened in position with fasteners 254. It is contemplated that body cap 248 can include a lower surface to enable mechanical communication with body 246 to bind body 246 from translational movement in the Z Direction; lower surface contains an aligner 258 to mechanically constrain the top of body 246 such that body 246 does not move in the X Direction and Y Direction; holes to allow fasteners 254 to pass through body cap 248 to mechanically fasten spacers 256; and has a center hole sufficiently large enough to enable key 236 to apply depression force 212 to receiver pad 238 or key 236 to apply depression force 212 to aperture cap 206. body cap 248 Can include aligner 258 disposed thereon and opposing body 246 and substratum 202. It is contemplated that body 246 can be constrained from having rotary motion about receiver pad 238, wherein mechanical constraint can be accomplished through a monolithic structure of body 246 and body cap 248 or a mechanical obstructer such as a protuberance (e.g., a pin) that engages body 246 or by a press fit to cause frictional forces. Exemplary body caps 248 include metal, polymer, glass, and the like. Moreover, body cap 248 have a rigidity so such that mechanical communication with spacers 256 and body 246 through fasteners 254 do not substantially deform body cap 248 that otherwise might compromise its functions. In an embodiment in reference to FIG. 9, body cap 248 is additively-manufactured plastic; has four symmetric holes allowing four fasteners 254 to mechanically fasten to four spacers 256; has an aligner 258 that mechanically constraints body 246 in the X and Y directions; has a lower surface that mechanically constrains body 246 in the Z direction; and has a center hole with diameter nominally smaller than the diameter of aperture cap 206 such that aperture cap 206 cannot rise above body cap 248.

With reference to FIG. 10, it is contemplated that retainer member 250 is in mechanical communication with housing 204 and provides structural support to electrical contacts 240 and switch housing 252. Exemplary retainer members 250 include metal, polymer, glass, and the like. In an embodiment in reference to FIG. 9, retainer member 250 can be disposed on housing 204; is made of machined stainless steel; is structured with a cylindrical hole having a diameter that is larger than receiver pad 238 or smaller than the diameter of switch housing 252 such that the switch housing 252 and receiver pad 238 are mechanically constrained within housing 204.

Figure 19:
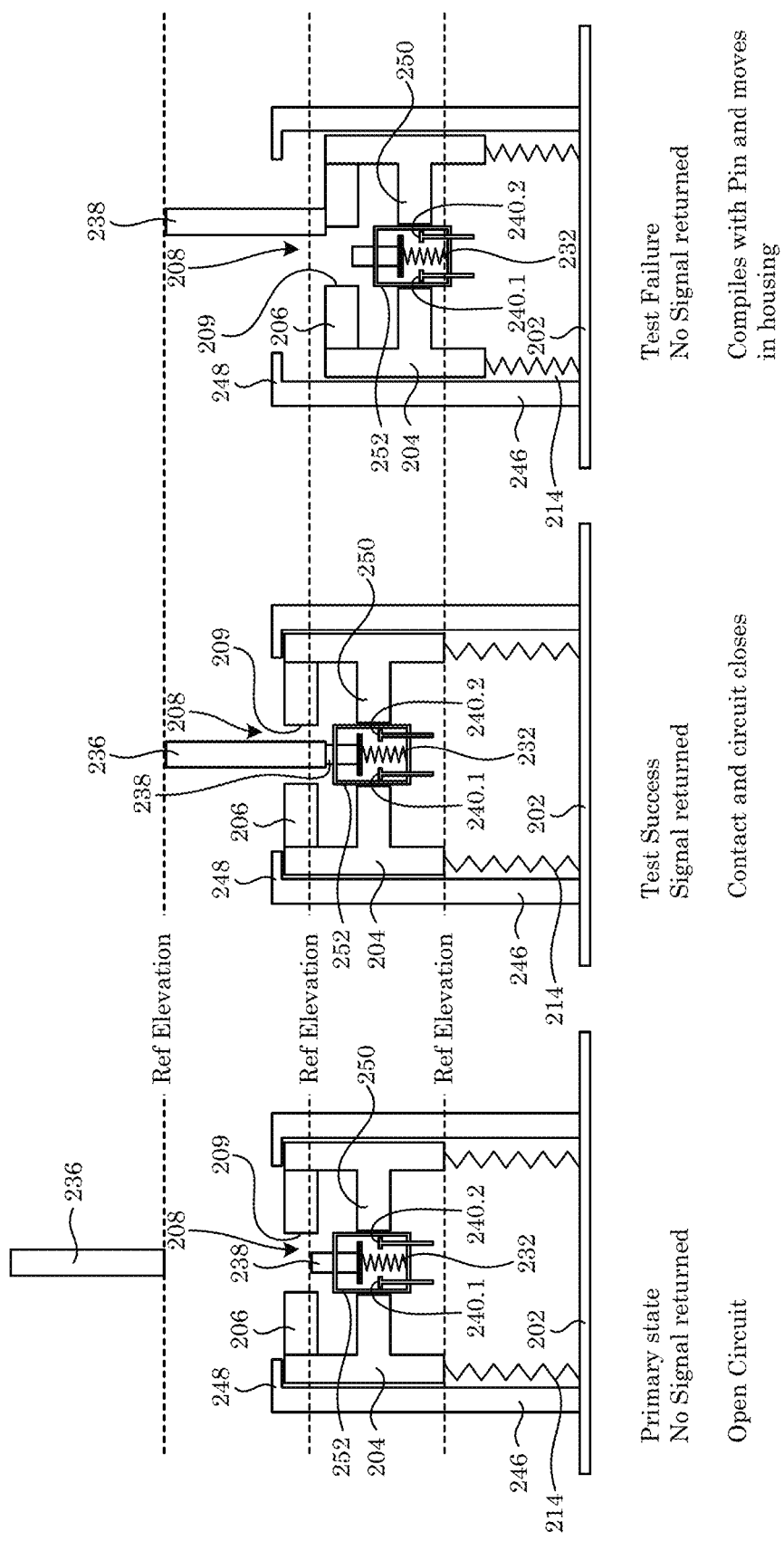
FIG. 19 shows a plurality of mutual mechanical positioning of a key relative to a position verification sensor.
Figure 32:
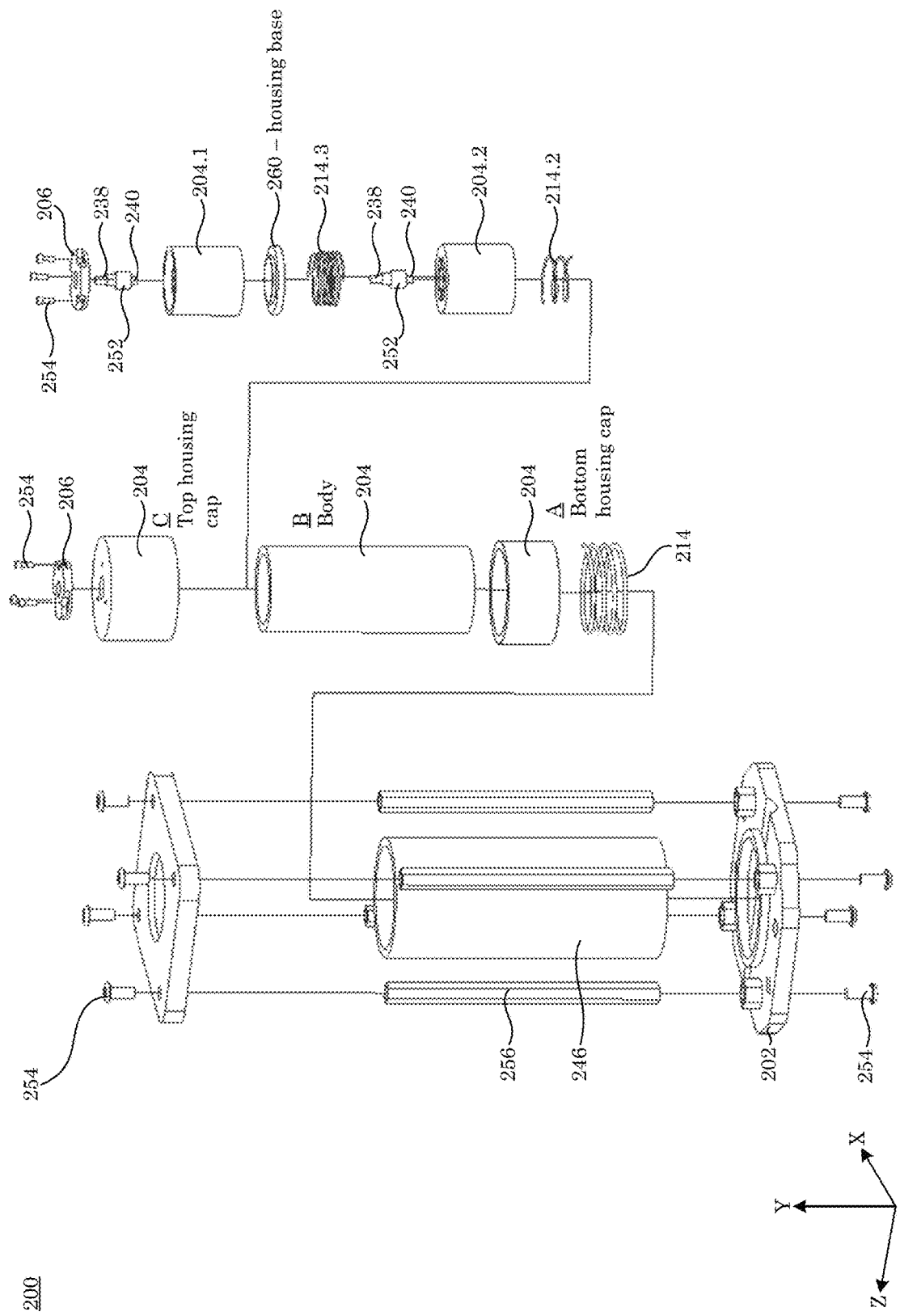
FIG. 32 shows an exploded view of the position verification sensor shown in FIG. 28.
Figure 33:
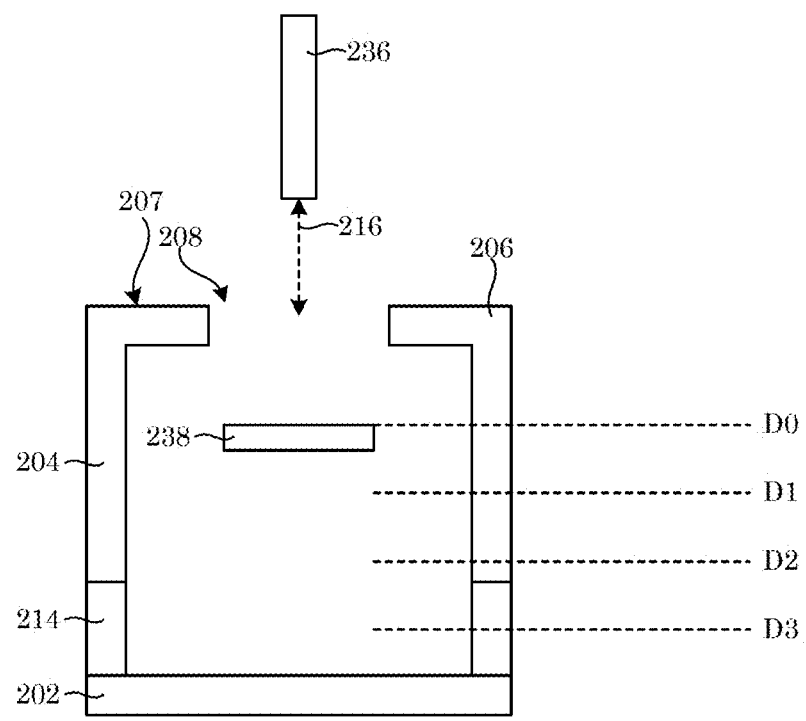
FIG. 33 shows a graph of output voltage versus receiver pad depth for a position verification sensor 200.
Figure 33:
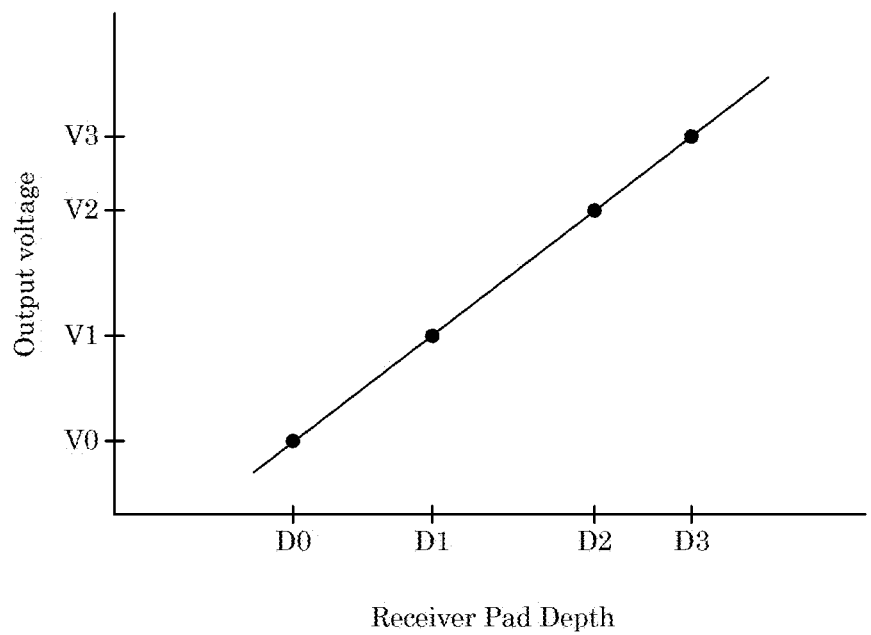

With reference to FIG. 9, FIG. 10, and FIG. 19, it is contemplated that switch housing 252 can support mechanical communication between receiver pad 238 and electrical conductors 240.1 and 240.2. Exemplary switch housings 252 include metal, polymer, glass, and the like. The switch housing 252 is in mechanical communication with retainer member 250. With reference to FIG. 32, for a plurality of receiver pads 238, there can be a corresponding quantity of switch housings 252 such that for every receiver pad 238 there is a switch housing 252. In an embodiment as shown in FIG. 9, switch housing 252 is constructed to be a single part with receiver pad 238 and electrical conductors 240.1 and 240.2; is in mechanical communication with retainer member 250; held in place with a fastener nut above retainer member 250 and threaded around switch housing 252; held in place with a fastener nut below retainer member 250 and threaded around switch housing 252; is encapsulated by compliant member 214 yet not switch housing 252 is not in mechanical communication with compliant member 214.

With reference to FIG. 8 and FIG. 9, it is contemplated that fastener 254 binds mechanical communication between aperture cap 206 and housing 204; fastener 254 binds mechanical communication between substratum 202 and spacer 256; fastener 254 binds mechanical communication between body cap 248 and spacer 256; fastener 254 can removable; and fastener 254 binds mechanical communication between aperture cap 206 and housing 204 and can be different from fastener 254 that binds mechanical communication between spacer 256 and substratum 202 and body cap 248. Exemplar fasteners 252 include metal, polymer, and the like. In an embodment, with reference to FIG. 9 and FIG. 32, fastener 254 that binds mechanical communication between aperture cap 206 and housing 204 is a metal socket head cap screw of screw size 1-72; fastener 254 that binds mechanical communication between substratum 202 and spacer 256 is a metal button head cap screw of screw size 10-32; fastener 254 that binds mechanical communication between substratum 202 and spacer 256 is a metal button head cap screw of screw size 10-32; fastener 254 can be removed with an Allen wrench tool of appropriate size for a 1-72 socket head cap screw; and fastener 254 can be removed with a commonly-available Allen wrench tool of appropriate size for a 10-32 button head cap screw. For a plurality of aperture caps 206, fastener 254 remains a metal socket head cap screw of screw size 1-72 for binding all aperture caps 206 with all housings 204.

With reference to FIG. 8, FIG. 9, FIG. 28, FIG. 29, FIG. 30, and FIG. 32, spacer 256 provides support for body 246 and elements internal to body 246 with a plurality of spacers 256 to provide an structural support around body 246 and its internal elements; spacer 256 is in mechanical communication with substratum 202; spacer 256 is fastened to substratum 202 with fastener 254; spacer 256 is in mechanical communication with body cap 248; spacer 256 is fastened to body cap 248 with fastener 254; and spacer 256 has a hole and internal surface to bind fastener 254. Exemplary fasteners 254 include metal, polymer, and the like. In an embodiment in reference to FIG. 8 and FIG. 9, four spacers 256 are shown; are hexagonal female threaded standoffs capable of receiving 10-32 machine screws; are made of metal; are 1½" in length; are in mechanical communication with substratum 202; are in mechanical communication with body cap 248; and spacers 256 are each fastened to fasteners 254 that are 10-32 button head cap screws. In an embodiment, with reference to FIG. 28, FIG. 29, FIG. 30, and FIG. 32, a plurality of receiver pads 238 and four spacers 256 are shown with hexagonal female thread standoffs that receive 10-32 machine screws; are made of metal; are 4" in length; are in mechanical communication with substratum 202; are in mechanical communication with body cap 248; and spacers 256 are each fastened to fasteners 254 that are 10-32 button head cap screws.

With reference to FIG. 8, FIG. 9, FIG. 28, and FIG. 32, aligner 258 is in mechanical communication with substratum 202 and body 246 to constrain movement of body 246 in the X direction and the Y direction; aligner 258.2 (disposed on body cap 248 opposing substratum 202) is in mechanical communication with body cap 248 and body 246 to constrain movement of body 246 in the X direction and the Y direction. Exemplary aligners 258 include metal, polymer, glass, and the like. Dimensions of aligner 258 can be selected such that its internal dimension is larger than the external dimension of body 246 such that body 246 is constrained in the X direction and the Y direction. An internal dimension of aligner 258 can be the same as internal dimension of aligner 258.2. In an embodiment, aligner 258 is an element on substratum 202; aligner 258.2 is an element of body cap 248; are of the same polymer as substratum 202; are cylindrical with an internal diameter, with an external diameter, and with a thickness to mechanically contact and constrain body 246.

Position verification sensor 200 can be made in various ways. In an embodiment in FIG. 9, a process for making position verification sensor 200 includes: providing substratum 202, wherein substratum 202 and aligner 258 can be made by additive manufacturing using a polymer; disposing receiver pad 238 on substratum 202; disposing body 246 on substratum 202 and aligner 258; disposing spacers 256 on substratum 202 and fastening spacers 256 to substratum 202 using fasteners 254; disposing compliant member 204 inside body 246 such that compliant member 204 is in mechanical communication with substratum 202; disposing switch housing 252, receiver pad 238, and electrical contacts 240.1 and 240.2 in housing 204 where switch housing 252 is mechanically fastened to housing 204; disposing housing 204 on compliant member 214 whereby housing 204 is in mechanical communication with compliant member 214; keyway aperture 208 can be formed in aperture cap 206 by a subtractive machining process; disposing aperture cap 206 on housing 204 using fasteners 254 to mechanically bind aperture cap 206 to housing 204; body cap 248 and aligner 258.2 are made by additive manufacturing using a polymer; disposing body cap 248 on top of housing 204; mechanically binding body cap 248 to spacers 256 using fasteners 254. The process for making position verification sensor 200 can include disposing pad support 232 on substratum 202; and disposing receiver pad 238 on pad support 232. Electrical contacts 240 can be attached to aperture cap 206 or receiver pad 238. Electrical conductor 242 can be attached to aperture cap 206 or receiver pad 238. A spring constant of compliant member 214 or pad support 232 can be adjusted.

The process for making position verification sensor 200 with a plurality of receiver pads 238, with reference to FIG. 32, can include additively manufacturing substratum 202 and aligner 258 as a single element; wherein spacers 256 are in mechanical communication with substratum 202; four spacers 256 are mechanically fastened to substratum 202 using four fasteners 254; body 246 is disposed on substratum 202 and in mechanical communication with aligner 258; body 204B is disposed on bottom housing cap 204A; compliant member 214.2 is disposed on bottom housing cap 204A; switch housing 252, receiver pad 238, and electrical contact 240 are all of the same part; switch housing 252 is mechanically fastened to housing 204.2 using fasteners provided with switch housing 252; housing 204.2 is disposed on compliant member 214.2 and housing 204.2 is in mechanical communication with body 204B; compliant member 214.3 is disposed on housing 204.2; an additional switch housing 252, receiver pad 238, and electrical contact 240 are mechanically fastened to housing 204.1 using fasteners provided with switch housing 252; aperture cap 206 is in mechanically contact with housing 204.1; aperture cap 206 is mechanically fastened to housing 204.1 using fasteners 254; housing base 260 is mechanically fastened to housing 204.1 with fasteners; housing 204.1 with the above elements fastened to it are disposed on compliant member 214.3; top housing cap 204C is disposed on body 204B; aperture cap 206 is mechanically fastened to top housing cap 204C using fasteners 254; compliant member 214.1 is disposed on substratum 202 within body 246; body cap 248 and aligner 258 are disposed on body 246; and body cap 248 is fastened to spacers 256 using fasteners 254.

Position verification sensor 200 has numerous advantageous and unexpected benefits and uses. In an embodiment, a process for determining an accuracy of mutual mechanical positioning of key 236 and position verification sensor 200 includes: moving key 236 relative to the position verification sensor 200; contacting position verification sensor 200 with key 236 by key 236 contacting cap surface 207 or receiver pad 238; producing null output 228 if key 236 does not contact receiver pad 238 by instead contacting cap surface 207; and producing target output 230 if key 236 contacts receiver pad 238. From target output 230, the accuracy can be determined by subtracting the numerical dimensional value of the key 236 from the numerical dimensional value of the keyway aperture 208. In an embodiment, key 236 is a cylinder with a diameter of 0.250 inches; keyway aperture 208 is a circular hole with a diameter of 0.251 inches; key 236 achieving target output 230 by passing through keyway aperture 208 to contact receiver pad 238 yields accuracy of 0.001 inches which is the difference between the diameter of the keyway aperture 208 and the diameter of key 236.

The process for determining accuracy can include providing key 236 and position verification sensor 200 with key 236; providing a plurality of keys 236 and a position verification sensor 200; providing a key 236 and a plurality of position verification sensors 200; and providing a plurality of keys 236 and a plurality of position verification sensors 200. A plurality of keys 236 can be mounted to the same apparatus to interact with position verification sensor 200; and can be mounted to a plurality of apparatus to interact with position verification sensor 200.

Position verification sensor 200 and processes disclosed herein have numerous beneficial uses, including quickly, compared to vision or laser-based methods, ascertaining the accuracy and repeatability of a positioning element (e.g., robot); being a cost-effective solution compared to vision-based or laser-based methods or technologies that are used to ascertain robot accuracy and repeatability; and being minimally invasive in that the position verification sensor 200 is can be relatively small in form factor. Advantageously, position verification sensor 200 overcomes limitations of technical deficiencies of conventional articles in that vision-based and laser-based technologies that are used to determine accuracy and repeatability require calibration which can be time-consuming and require specific skills. A benefit of position verification sensor 200 is that once position verification sensor 200t is mounted in a work volume, location of receiver pad 238 to key 236 mounted on an apparatus is taught and a program is created where the apparatus moves key 236 to the receiver pad 238. This program can be repeated whereby key 236 will either achieve target state 226 with receiver pad 238, or key 236 will achieve null state 224 with cap surface 207.

Moreover, position verification sensor 200 and processes herein have numerous advantageous properties. In an aspect, position verification sensor 200 includes a plurality of receiver pads 238 to provide a selected accuracy of measurement with a plurality of aperture caps 206 and keyway apertures 208.

Position verification sensor 200 and processes herein unexpectedly provide determination of accuracy of a positioning system prior to accuracy degradation that can negatively impacting a manufacturing process and provide ascertainment of change in accuracy of a robot work cell prior to a change in accuracy resulting in a negative impact on a manufacturing process that decreases part quality, process productivity, or asset availability below acceptable thresholds. Further, position verification sensor 200 can include a plurality of keys 236 disposed in a plurality of locations including a tool flange of a robot, the physical body of the tool, a dynamic face of the tool (i.e., moving fingers of a gripper), and on an exemplar part that the robot manipulates.

The articles and processes herein are illustrated further by the following Example, which is non-limiting.

EXAMPLE

Examining Work cell Kinematic Chains to Identify Sources of Positioning Degradation Automated industrial work cells are becoming increasingly complex and varied due to greater accessibility of advanced robotic and sensing technologies. Degradation monitoring and diagnostics can improve to reduce the impact of increased system complexity on troubleshooting faults and failures and to optimize system operations. A position verification sensor monitors kinematic chains commonly found in robot work cells and provides identification of degraded components that contribute to relative positioning accuracy error between moving objects, tools, devices, and other components. Industrial robot users and integrators can integrate the position verification sensor to examine kinematic chains within work cells. With the position verification sensor, degradations can be identified at a selected resolution for improved maintenance planning and production control.

Robotics, along with supporting sensing and automation technologies, are used for a variety of tasks throughout the manufacturing industry. As robotic and sensor technologies have evolved, the diversity and complexity of use cases have grown. There is a need to better understand the health and wear of these automation systems, as the manufacturing community increases their reliance on advanced technologies. Systems can be maintained more efficiently, leading to a more robust process when health information is generated.

An element of industrial robot work cells is reliable and repeatable positioning. In some robot work cells, a six degree of freedom (6DOF) industrial robot arm is used as a macro positioner for an end effector as tooling mounted to the tool flange of the robot. The tool may be a gripper in a material handling application, or it could be a welding gun, paint applicator, or tooling for another operation. A work cell can be configured such that the end effector is changed during operations to enable a single robot to serve as the macro positioner for multiple tasks. Reliability of positioning accuracy for robots is provided by position verification sensor.

The position verification sensor provides information germane to monitoring kinematic chains found in robotic work cells. The position verification sensor can be used in many environments including a 6DOF industrial robot arm work cell and is a low-cost, minimally invasive article that determines health of a robot work cell and provides where in a kinematic chain positional errors are originating. The position verification sensor can verify and validate health monitoring of work cell technologies.

The Prognostics and Health Management (PHM) community is focused on advancing monitoring, diagnostic, and prognostic capabilities to maintain or improve asset availability, product or process quality, and productivity of a range of operations, including those within manufacturing. PHM has been actively applied to manufacturing factories with varying success. This has included the development and implementation of numerous strategies to minimize reactive maintenance and optimize the balance between preventive and predictive maintenance.

Most manufacturing robot work cells can be considered complex systems of systems. The overall physical system can be broken down into sub-systems, components, sub-components, etc. Decomposing the physical elements of a robot work cell into a hierarchy of elements offers a means of defining boundaries that can drive maintenance activities. This physical hierarchy can be connected with functional and informational hierarchies to provide a means of understanding complex relationships and identifying metrics and measures of work cell health. The more complex a system, the more critical it becomes to understand its inherent relationships to see how the state of mechanical degradation of physical elements impacts process performance.

Research has been performed in monitoring the health, including positioning, of a robot, itself, separate from the work cell. Vision and laser tracker systems are two types of technologies that have been paired with PHM algorithms to enhance health awareness. There is a need to expand the health monitoring capabilities beyond the robot, itself, and to consider the entire robot work cell. Understanding and monitoring the positioning health of all elements of kinematic chains is a necessary part of a comprehensive PHM system for robot work cells. Prior research has been performed in monitoring the health of robot work cells, yet research has not been found that focuses specifically on monitoring kinematic chain health. Existing robot monitoring approaches present unique solutions that are either too high-level and lacking specific guidance or rely upon potentially costly technology. The position verification sensor provides monitoring and analyzing the kinematic chain for positional degradation in a cost-effective and minimally-intrusive manner to increase benefit for the robot work cell owners and users.

Kinematic chains can be documented at various levels of complexity for the same mechanism. At the most detailed level, a kinematic chain contains all bodies, including components and sub-components, fasteners, and other parts. The documentation of some kinematic chains may only include links between actuated joints or express entire actuated assemblies as single links.

It is beneficial to observe multiple points along a kinematic chain in a serial manipulator to monitor positioning accuracy and identify the source of positioning errors. By inspecting repeatability at multiple points along a chain, the source of repeatability degradation can be narrowed down to the component(s) located between adjacent inspection points. To facilitate this, a way of representing a kinematic chain is needed that provides sufficient detail to choose relevant inspection points to meet monitoring objectives. To develop this representation, a suggested starting point is to document the chain at the component level while identifying the relationships between components through their interfaces.

Figure 20:
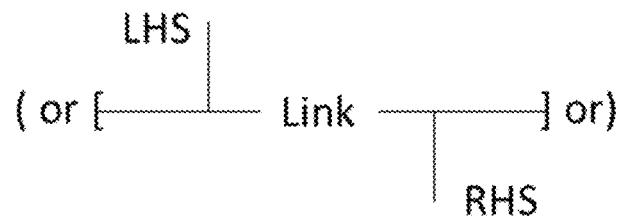
FIG. 20 shows a kinematic chain individual link (A) for a generic link, (B) for a robot with permanent connections at both interfaces, and (C) for a gripper with intermittent connection on an element (e.g., part) and permanent connection to another element (e.g., robot)
Figure 20:
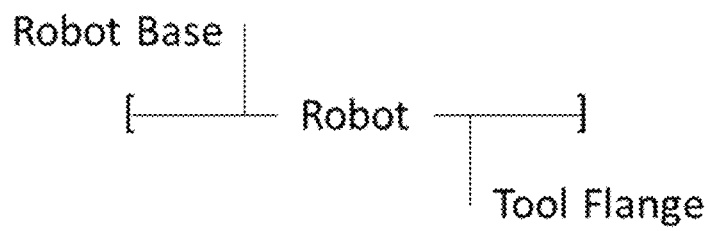
Figure 20:
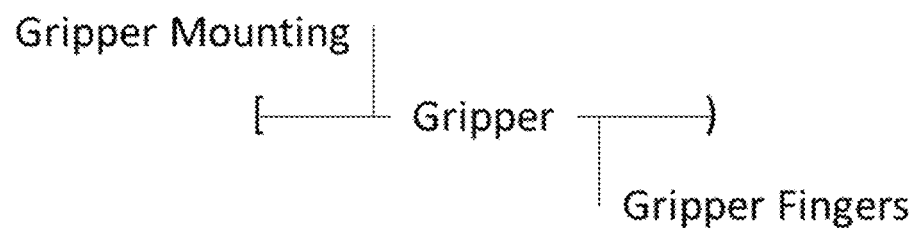

The kinematic chain is made of links which can be connected to other links or a reference frame. Each component or element of the system is considered a link in the kinematic chain. Each link has a left-hand side (LHS) and a right-hand side (RHS) which correspond to that component's interfaces with other links in the chain. It is important to note that LHS and RHS elements are physical pieces of the link, itself. For example, if a robot is a link, the LHS would likely be the robot's base since that would be physically connected to a mounting surface and the RHS would likely be the robot's tool flange since this is where an end effector would be joined. At the LHS and RHS boundaries of each link, permanent connections are represented by brackets '[,]' and intermittent connections with parenthesis '(,)'. For example, a gripper, which is permanently fixed to a robot tool flange, will have a '[' on its LHS corresponding to the permanent connection to a robot and a ')' on its RHS corresponding to an intermittent connection to a part as shown in FIG. 20.

Figure 21:
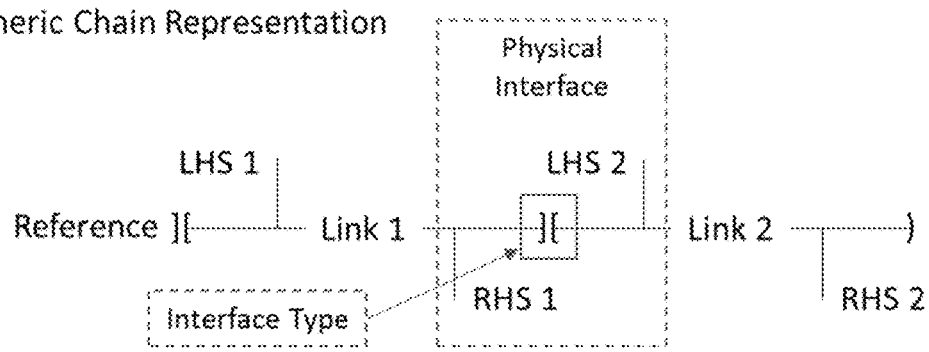
FIG. 21 shows a kinematic chain of two links (A) in generic representation and (B) for a robot and gripper.
Figure 21:
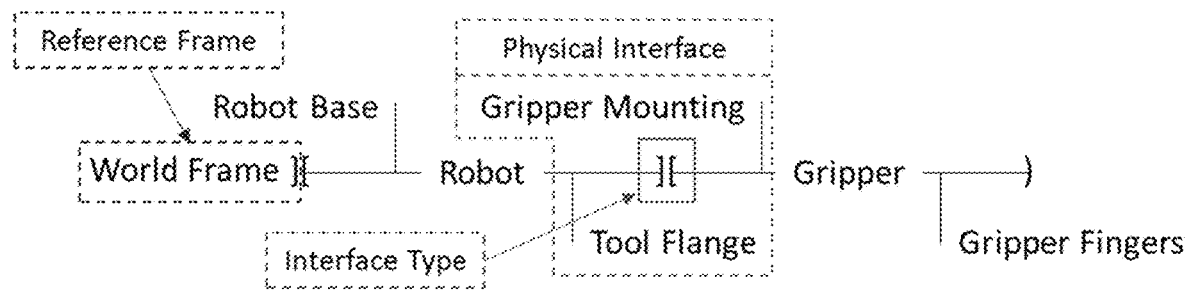

When individual links are joined to form a kinematic chain, the physical interfaces, represented by the LHS and RHS of adjacent links and the type of connection (permanent or intermittent), are identifiable as seen in FIG. 21. A reference frame exists at a boundary at either the far left or far right (or both) of the chain to provide a basis of measurement. Using this convention also allows for the kinematic chain to be represented in text. A single link can be represented as [LHS, Link, RHS] or more simply [Link]. For example, the chain in FIG. 21(a) can be represented as 'Reference] [LHS 1, Link 1, RHS 1] [LHS 2, Link 2, RHS 2)' or in a simpler form 'Reference] [Link 1] [Link 2).'

A variety of components are typically chosen by a machine integrator for specific tasks during industrial robot work cell design and integration. This variety can pose a challenge in expressing the range of possible configurations. A robotic work cell can include an industrial robot arm and an end effector. These components will serve as the starting point of the kinematic chain as shown in FIG. 21(b). Not all kinematic chains remain intact throughout the entirety of a manufacturing process. In use cases where there are multiple, swappable end effectors, multiple chains will exist throughout the overall process. Likewise, an end effector may perform two or more functions. Each function will generate a unique kinematic chain which includes the interactions that are specific to those functions. Additional chains will need to be documented and analyzed in these scenarios.

Beyond the robot arm and end effector, additional work cell components are considered part of the kinematic chain if they impact the positional accuracy of any component or action within the process. These components include elements that are not actuated or actively controlled yet are critical in the relative positioning of parts and equipment during operation. For example, a hard stop may be used to orient a part. If the hard stop is not properly positioned, the part will not be oriented properly when aligned with the stop. Therefore, the hard stop should be included in the kinematic chain. Additional components can also include parts being worked on and the fixturing that is holding them.

Figure 22:
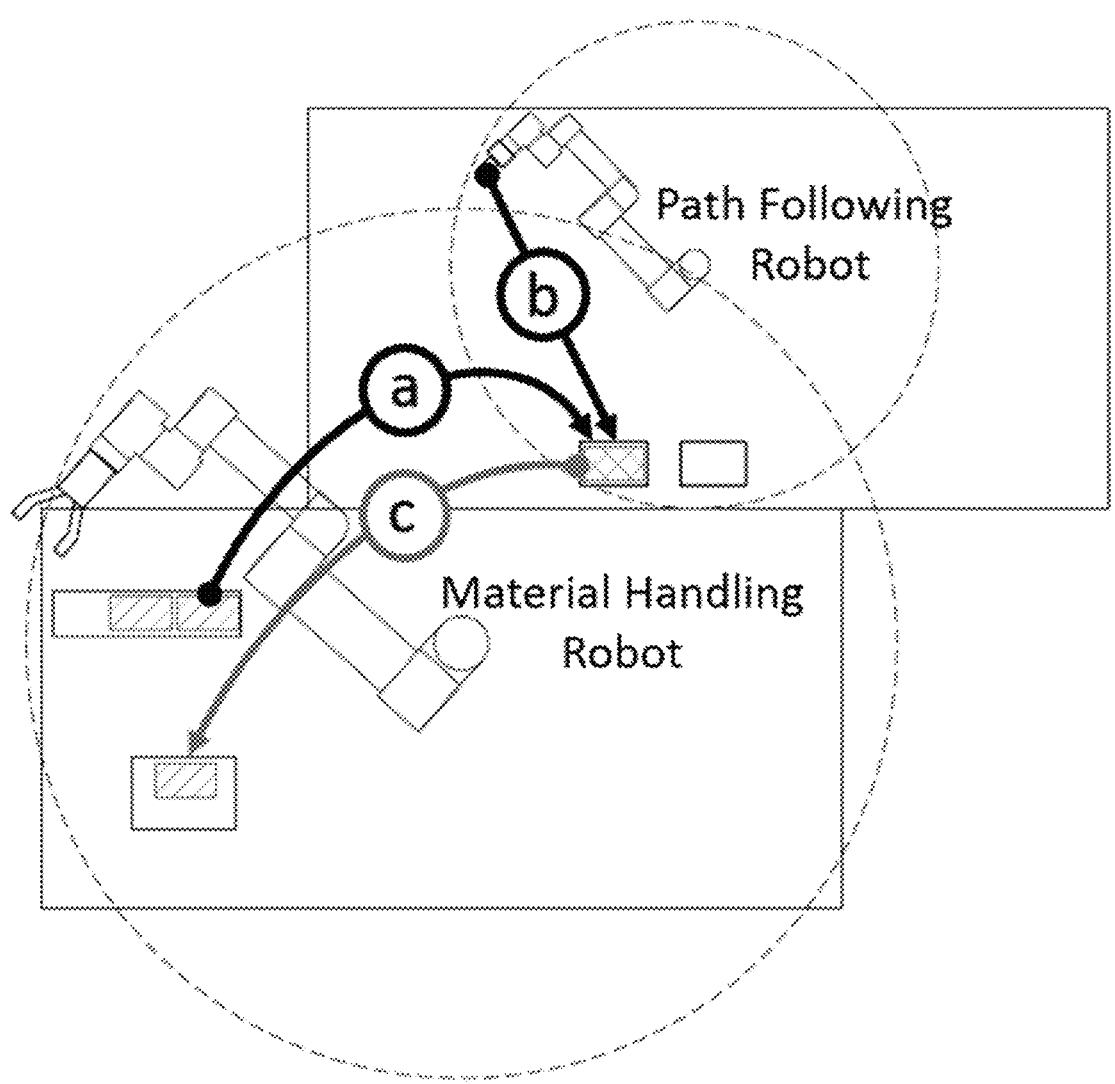
FIG. 22 shows (A) a material handling robot moving a part to a work fixture, (B) a drawing robot drawing on the part, and (C) a material handling robot moving a completed part to an output.

A material handling robot and a path-following robot was a platform to support robotic work cell PHM research. The use case begins with the material handling robot, with a gripper end effector, picking parts from an input, and placing them on a work fixture (FIG. 22(a)). The path following robot, with a pen holding end effector, then draws on the part (FIG. 22(b)). Once the drawing operation is complete, the part is then picked by the material handling robot and placed in an output location (FIG. 22(c)).

Figure 23:
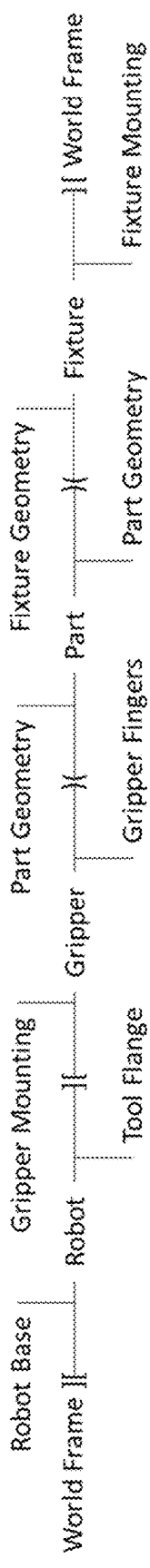
FIG. 23 shows a material handling robot kinematic chain (A) in a graphical representation, (B) in a long-form text representation, and (C) in a short-form text representation.
Figure 24:
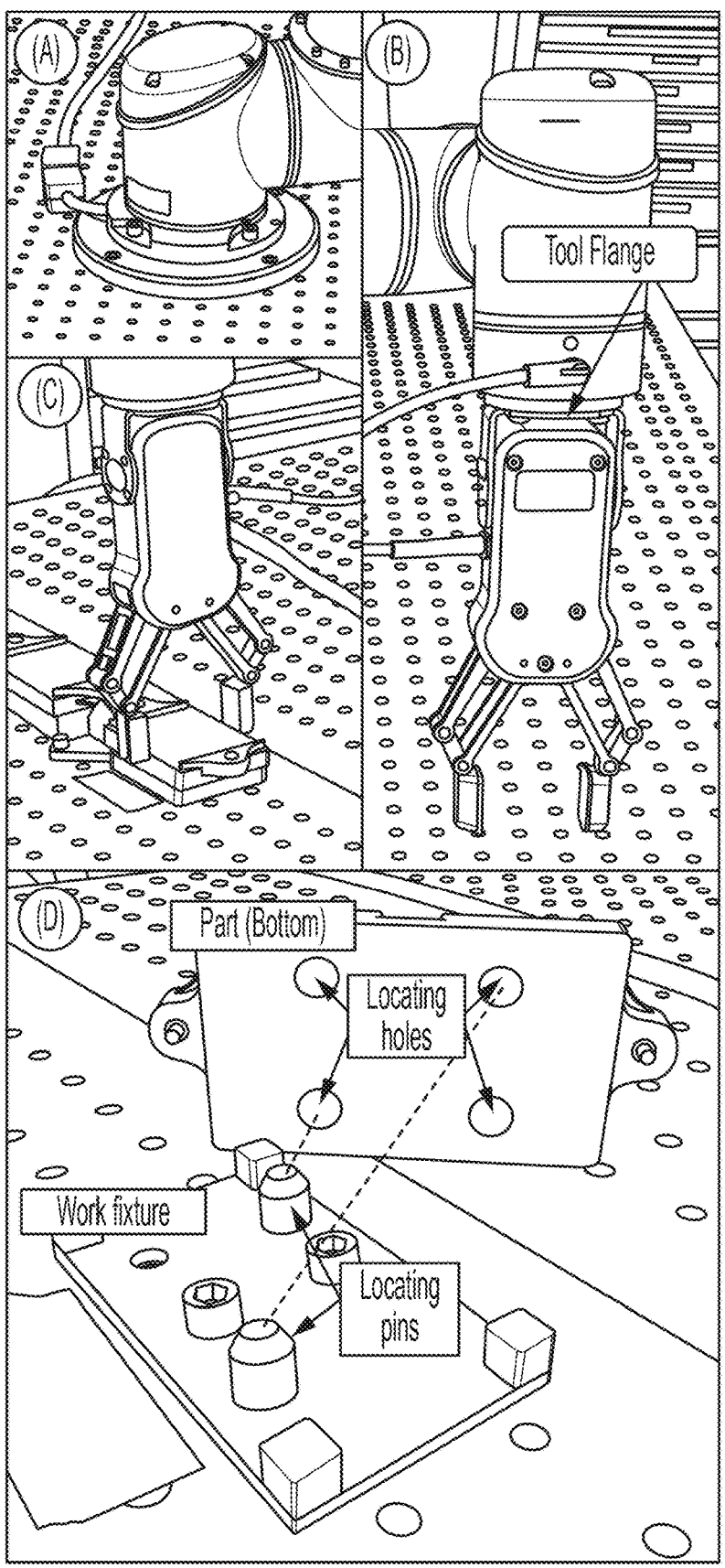
FIG. 24 shows material handling robot relationships (A) for a robot base to a table, (B) for a robot tool flange to a gripper mounting, (C) for gripper fingers to a part when on a fixture, and (D) for a fixture to table.

As seen in FIG. 23, for this use case, the world frame is the reference frame and is set by the table which the robot and fixtures are rigidly mounted on. The robot is the first link, followed by the gripper, then the part, and finally the fixture. The critical relationships in this kinematic configuration include the robot base to a table—a permanent connection shown in FIG. 24(a), the robot tool flange to the gripper mounting—a permanent connection shown in FIG. 24(b), the gripper fingers to the part—an intermittent connection shown in FIG. 24(c), the part to the fixture—another intermittent connection, and the fixture to the table—a permanent connection highlighted in FIG. 24(d).

When the robot is in position to pick or place a part, there is a constrained relationship between the part and the gripper, as well as the part and the fixture. The robot must position the gripper in a designed relationship to the fixture (and part) during part pick and placement because of these physical constraints. The interfaces of the intermittent connection between the gripper and part are shown as the RHS of the gripper (gripper fingers) and the LHS of the part (part geometry) respectively. Likewise, interfaces of the intermittent connection between the part and the fixture are shown as the geometries of the part and the fixture.

With regard to inspecting the kinematic chain to identify degradation, identifying and tracking degradation of work cell components includes measuring positioning repeatability of key points along kinematic chains. By inspecting the positioning repeatability of individual components relative to a reference frame, components which have degraded in their ability to position repeatably beyond a design limit can be identified. The position verification sensor included treating kinematic chains as open loop chains due to the nature of serial manipulators. There may be work cell configurations where the kinematic chain is represented as a closed loop, as in the use case, but by inspecting individual points along the chain. This does not pose an issue. In cases where the chain is a closed loop, which is typically due to multiple components interfacing directly with the same reference frame as the robot, inspections may need to be carried out working from both the LHS and RHS reference frames.

Figure 25:
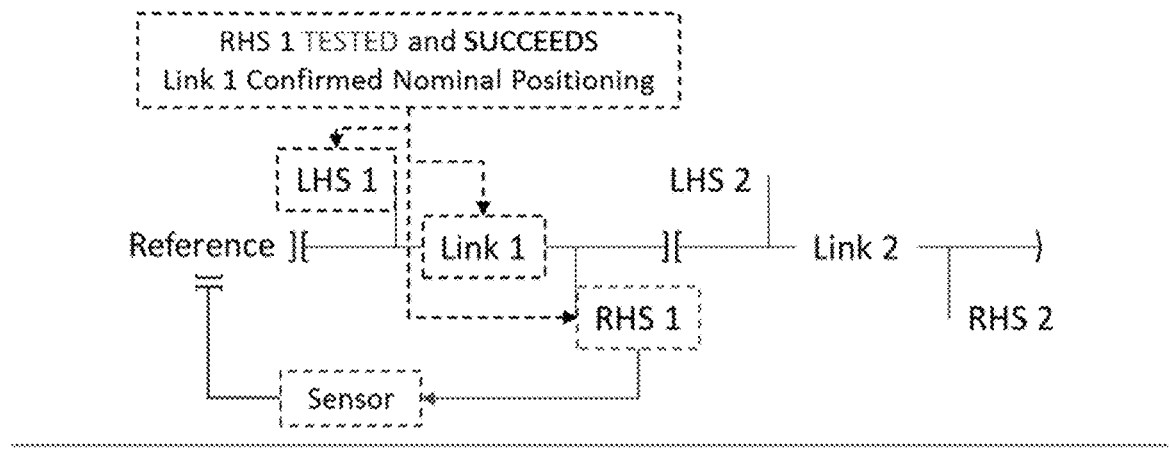
FIG. 25 shows annotated generic link inspection.
Figure 25:
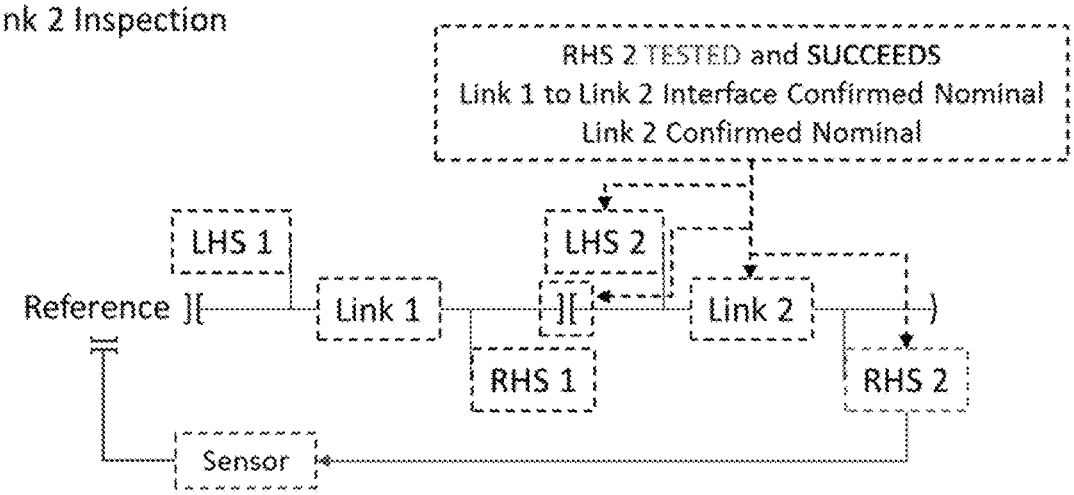

Inspection of components starts at a reference frame. The measurement sensor(s) is in a known location to the reference frame and is assumed to be positioned and operating properly. Working left-to-right in the kinematic chain, the sensor(s) is fixed in the left most reference frame. Inspection begins at the RHS of the first component (link) with the testing of the position of the RHS of the component at a taught position. This assesses if the first component is maintaining sufficient repeatability to succeed. If the test is successful, then all parts of the first link are being positioned nominally. This is represented in FIG. 25(a). After the first component is tested to be within specification the process continues, from left to right, by inspecting each component to confirm that each link is achieving its nominal test positions. After the RHS of the second link is tested successfully, the interface between the first and second link can be declared nominal and all parts of the second link are positioned nominally. This is represented in FIG. 25(b).

The decision of whether a component is being positioned nominally and a test is successful will depend on the designed allowance in the system. Due to tolerance stacking, it is not unusual to expect the allowance of components further from the reference in the kinematic chain to be higher and must be considered when choosing the sensor(s) used for inspection. It can also be beneficial to choose inspection points other than the RHS of links in the kinematic chain depending on the work cell. To help choose these points, an analysis of modes of positioning degradation is recommended.

With regard to identifying positioning degradation modes along the kinematic chain, sources of positional relationship issues can be identified once the kinematic chain and the interactions between components are mapped. The type and cause of positioning error will vary based upon the components within the work cell. Degradation modes can be found by assessing each link and the interactions between the links.

A link can be actuated, like a robot, or rigid, like a part. These two types of links can degrade in many ways which can be classified as either rigid body deformations, or degraded actuation and positioning. With an actuated link, such as a robot arm, if any joint in the robot is not positioning itself correctly, the tool flange and end effector will not be positioned correctly. These positioning errors can present themselves instantaneously after crashes or over time after wear. Likewise, deformation of rigid bodies can occur instantaneously or over time. For example, gripper fingers may bend when colliding with a foreign object in the work cell as compared to the fingers fatiguing and bending over time after repeated use. Each link is susceptible to degradation and will influence how that component and the rest of the work cell performs.

In addition to the positioning error modes from the links, themselves, the interactions between the links must be studied to assess the impact of link degradation on the relationships. Many different interactions can exist within the work cell. Couplings between components are either permanent or intermittent. Generally, the interface between two components is critical when the components' interaction is intermittent. This type of interaction requires the components to be in their designed positions and may involve a specific actuation for coupling. This means that if a component is positioned improperly, the geometry is inaccurate or unexpected, or a component cannot actuate as intended to successfully execute the interaction, the process can be considered degraded and may not perform nominally. For example, when a part is being grasped by a gripper, the part must have the expected geometry and be properly positioned for the gripper which must be in the expected position and actuate as designed to successfully grasp the part.

A variety of positioning degradation modes were identified within the use case. Degradation modes were identified for the components of the kinematic chain as well as the interactions between components. Starting at the world frame and examining the kinematic chain of FIG. 23, moving left to right, modes are identified. The Table lists identified degradation modes.

TABLE

| Kinematic Chain Section | Degradation Mode(s) |
| --- | --- |
| World Frame][Robot Base | Loose Connection |
| [Robot Base, ROBOT, Robot Tool Flange] | Robot Wear |
| Robot Tool Flange][Gripper Mounting | Loose Connection |
| [Gripper Mounting, GRIPPER, Gripper Fingers] | Gripper Wear |
| Gripper Fingers)(Part Geometry | Gripper Wear, Bad Part* |
| [PART] | Bad Part* |
| Part Geometry)(Fixture Geometry | Bad Part*, Bad Fixture** |
| [Fixture Geometry, Fixture, Fixture Mounting] | Bad Fixture** |
| Fixture Mounting][World Frame | Loose Connection |

*From either part inaccuracy or damage
**From either fixture positioning inaccuracy or fixture wear/damage The modes internal to components, including robot wear, gripper wear, bad parts, and fixture wear are expressed as between the LHS and RHS of their respective components. The connection is assumed as the only failure mode between two links that are permanently fixed to one another and other modes are considered as part of the components. For the intermittent interactions between the part and the gripper, and the part and the fixture, any of the components can contribute to positioning error leading to multiple modes listed.

With regard to selection of key measurement points to identify points or areas of degradation and the position verification sensor, discrete points along the kinematic chain can be selected for inspection to detect positioning deviations from nominal or verify nominal positioning. These key measurement points were tested in one or more degrees of freedom to determine if they can be positioned within designed limits. Each point was chosen to provide information on the source of a positioning error when measured in a specific order. A starting point in a LHS-referenced kinematic chain is the RHS of each link in the chain. Inspecting the RHS of each link will provide insight into the repeatability of each component. However, if a component such as an end effector is actuated, it may be beneficial to inspect both the RHS and another point earlier in the kinematic chain. Inspecting before an actuation point of a particular component, the source of repeatability degradation can be isolated to within the component or to the connection between the component and the preceding component. Additionally, an actuated component can be inspected in multiple configurations or states to provide further isolation of degradation.

Figure 26:
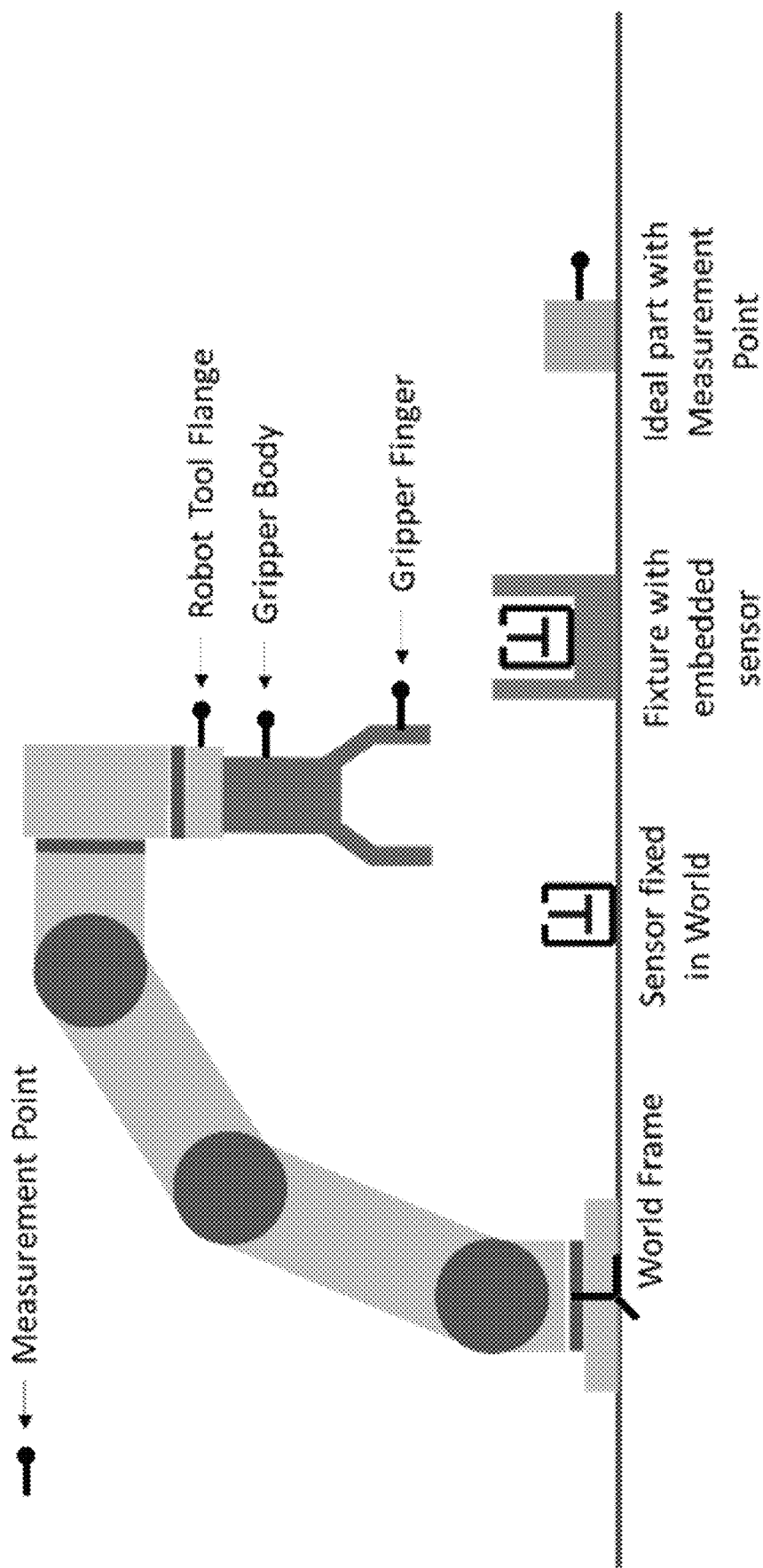
FIG. 26 shows a measurement point selection.

Applying this methodology to the use case, the key points selected were the robot tool flange, gripper fingers, and part geometry because they are the RHS of the components of the chain. Because the fixture link is directly connected to the world frame on its RHS, the LHS of the fixture link, fixture geometry, should be selected as a key point. Examining the gripper further, it is actuated and can have multiple states (i.e., open, gripping a part, closed) throughout its operations and can be inspected in more places than only the RHS. By selecting the gripper body as a key point before the finger actuation in the chain, the gripper mounting can be tested independently of the finger actuation. Likewise, testing the fingers in both an open and closed state, the operation and positioning of the gripper fingers can be tested independently of the gripper mounting. To test the part geometry, the system must grasp an ideal part so the part position can be tested in-situ. To test the fixture geometry, a sensor can be mounted to or embedded in the fixture. These points are represented in FIG. 26.

Figure 27:
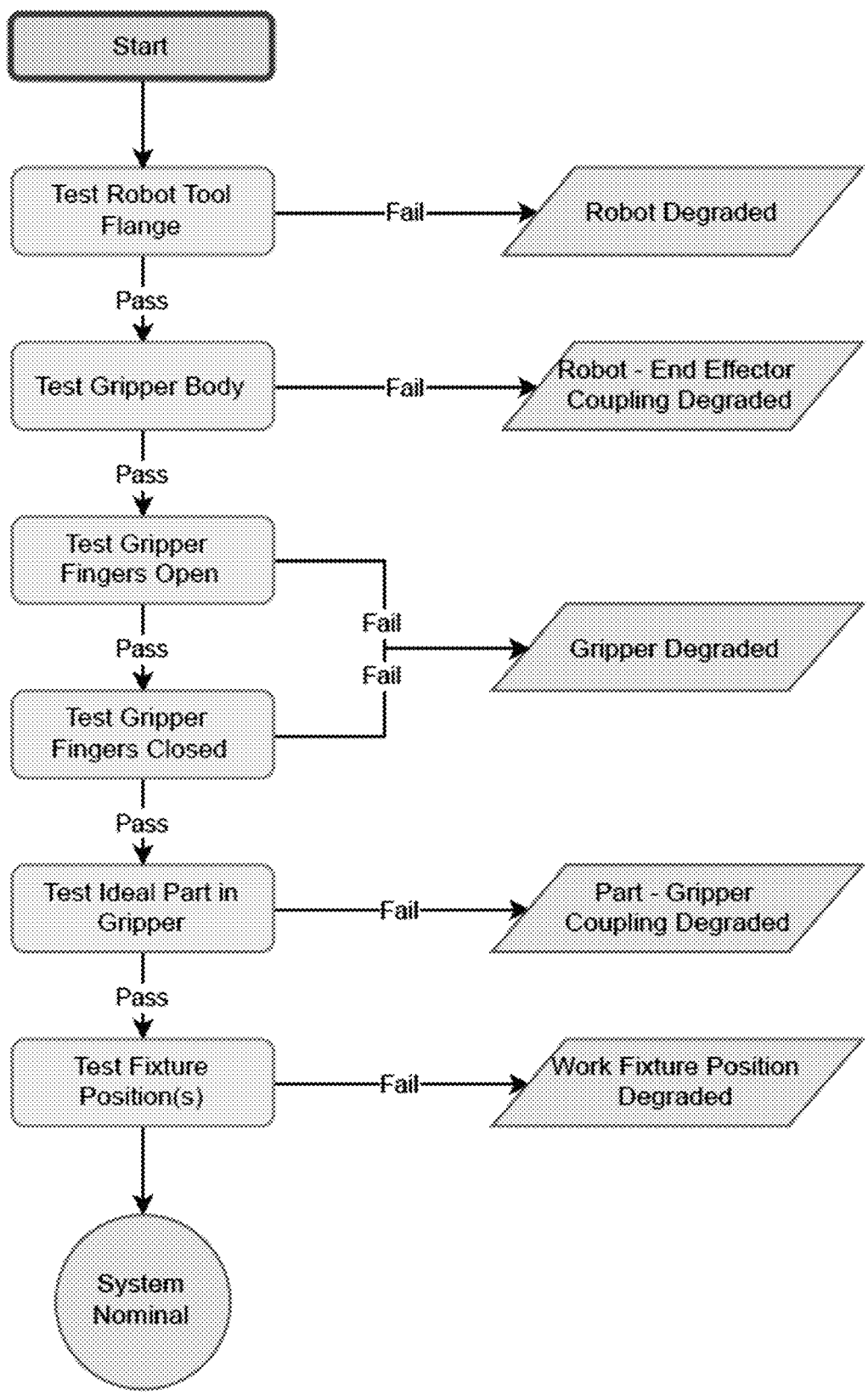
FIG. 27 shows a binary decision tree to identify a degraded component.
Figure 28:
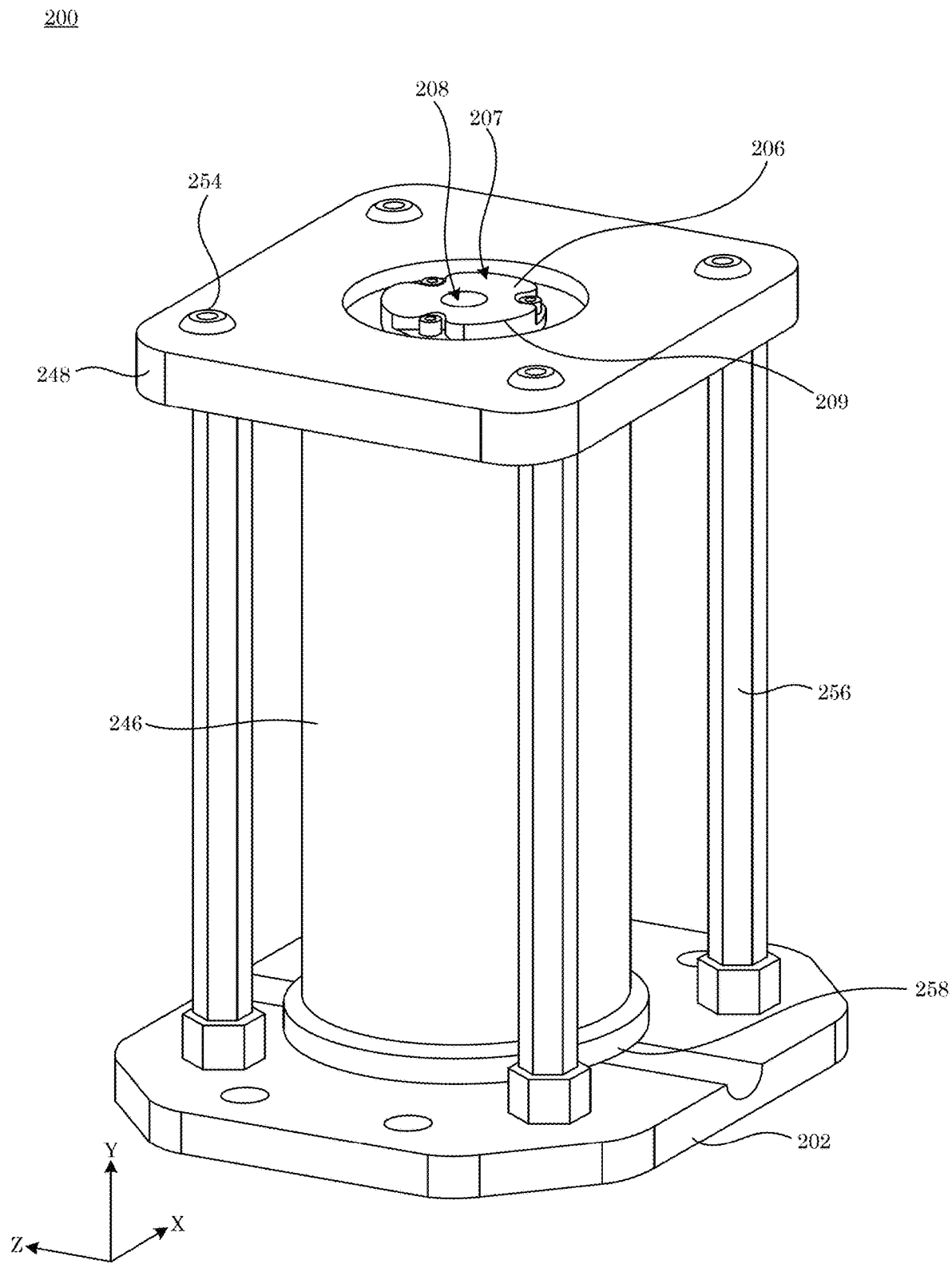
FIG. 28 shows perspective view of a position verification sensor with a plurality of receiver pads.
Figure 29:
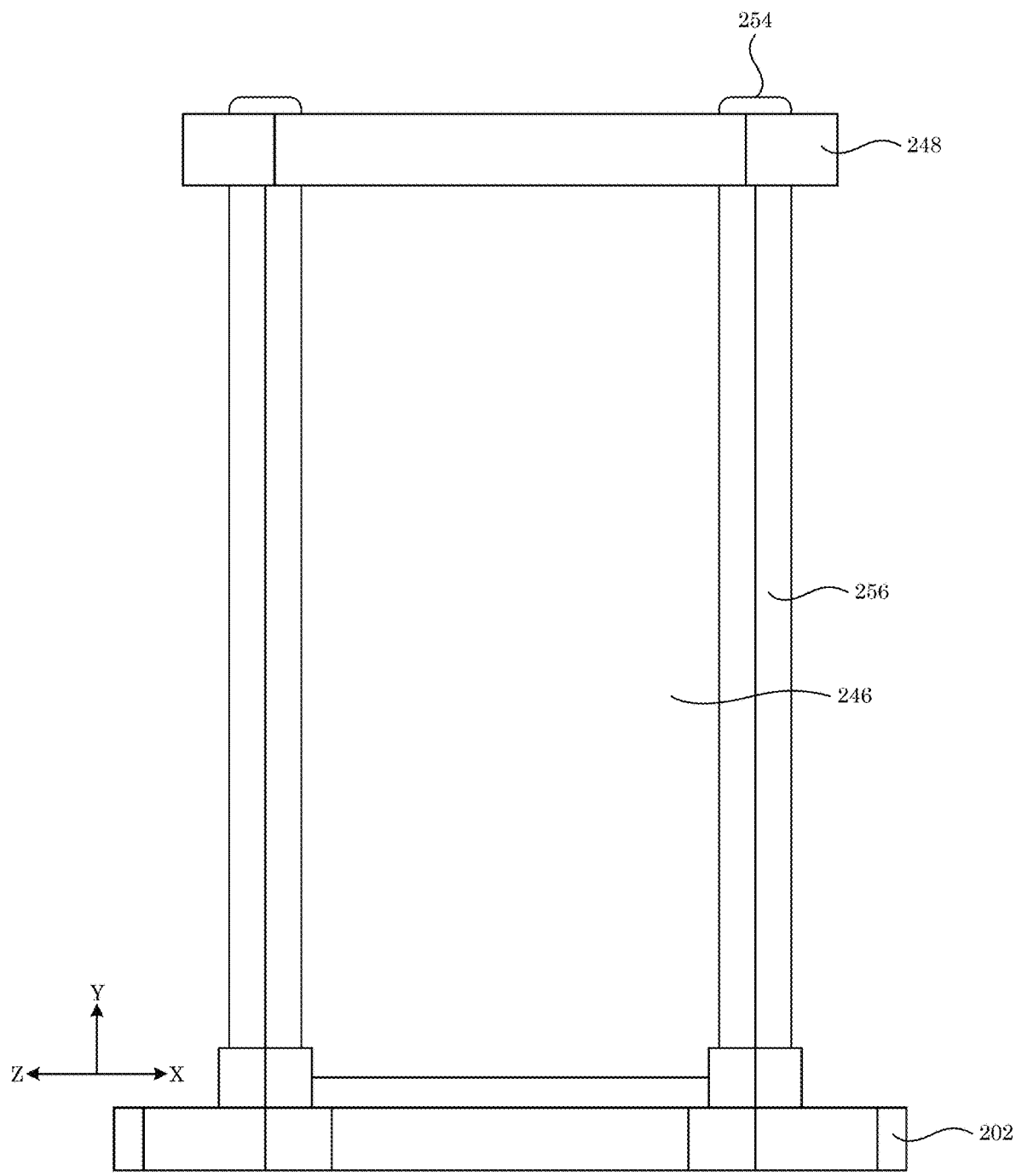
FIG. 29 shows a side view of the position verification shown in FIG. 28.
Figure 30:
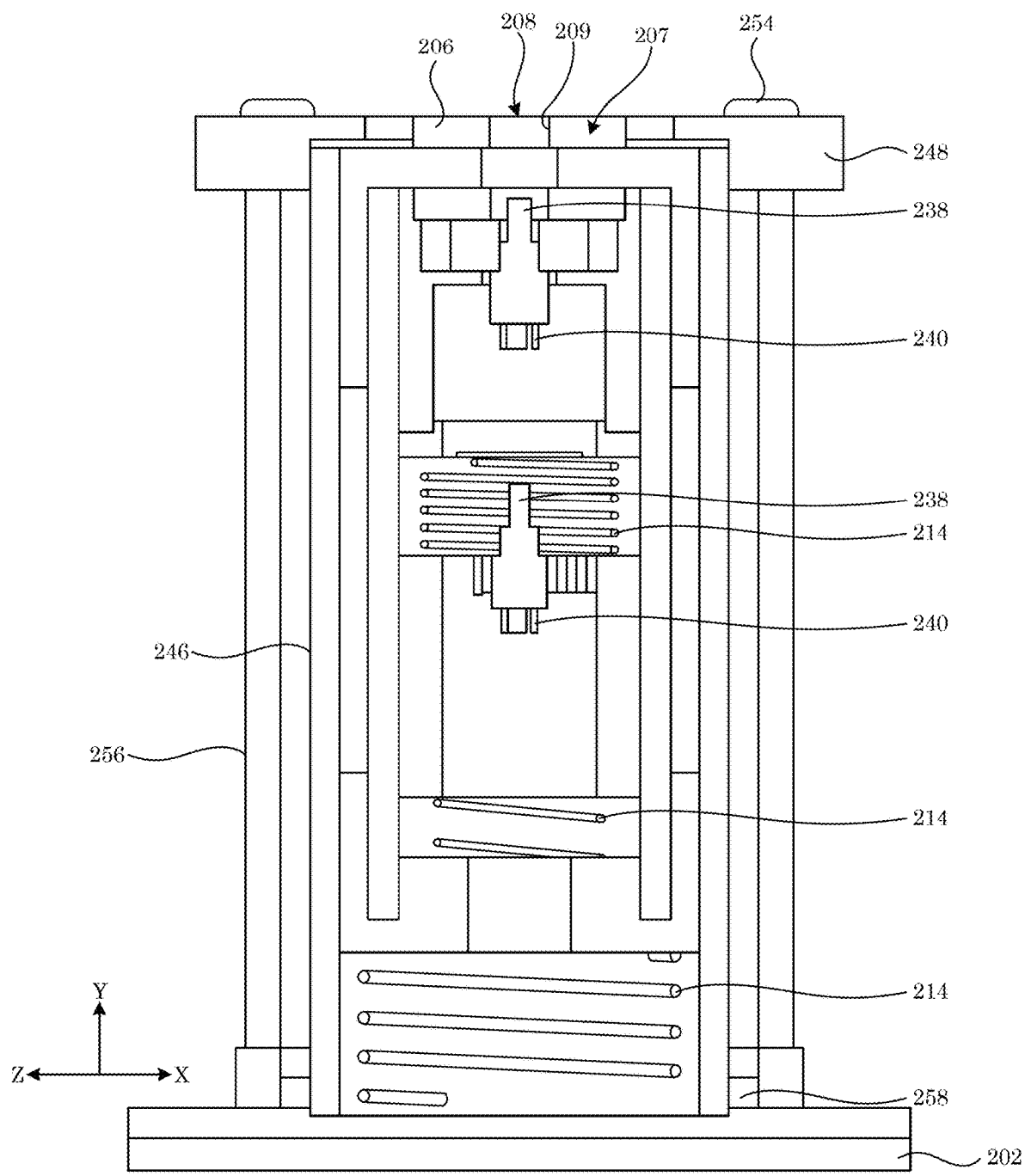
FIG. 30 shows a cutaway view of the position verification sensor shown in FIG. 28.
Figure 31:
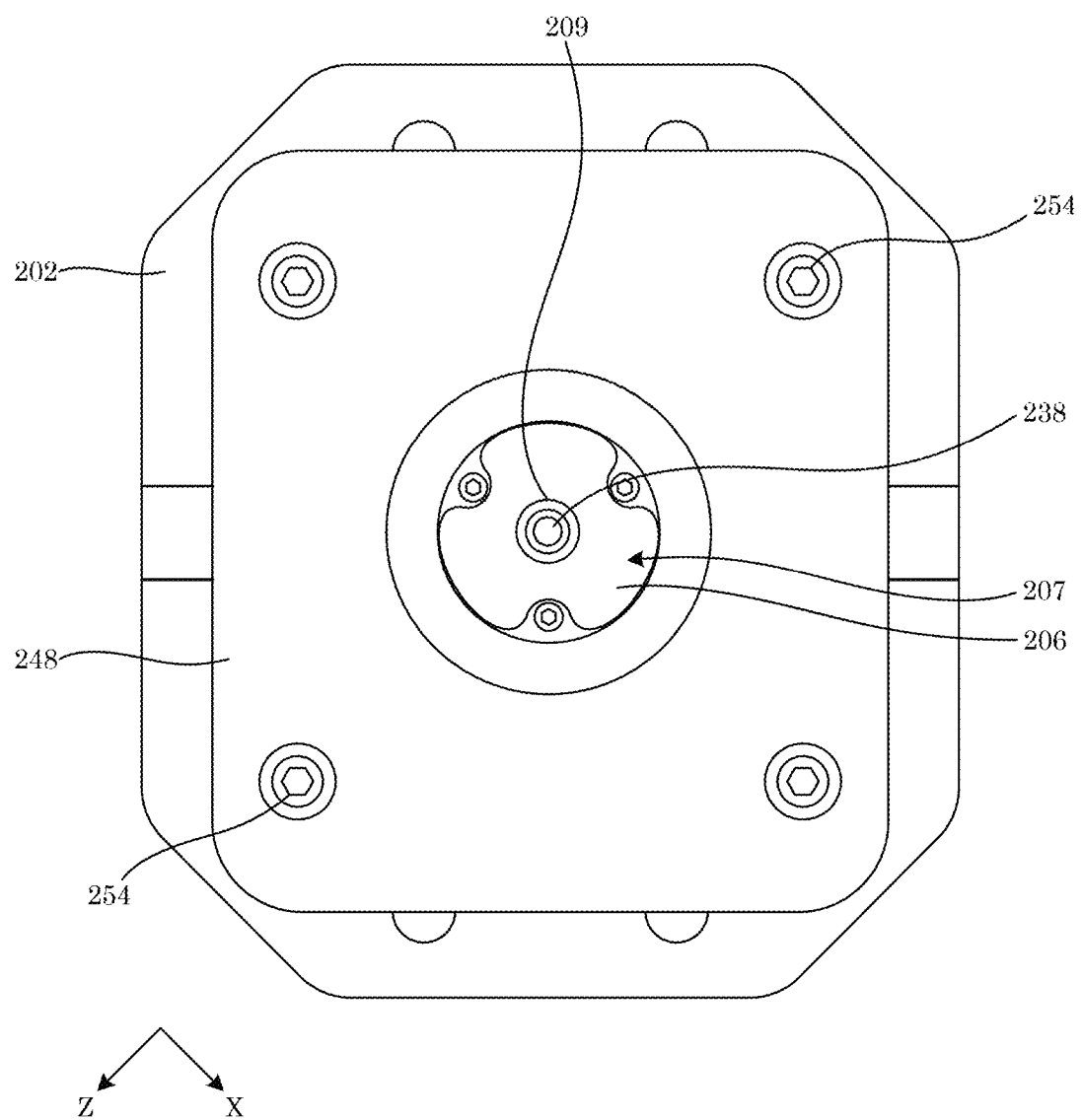
FIG. 31 shows a plan view of the position verification sensor shown in FIG. 28.

Appropriate tolerancing or analysis thresholding was chosen for the pass or fail classification of each of the key points selected. Given the tolerance and monitoring requirements of the use case, appropriate sensors were chosen. The key points were tested in a sequence following the kinematic chain, left-to-right, once the sensors were integrated. The feedback from testing provided a series of binary decisions to identify degraded components. Decision trees and testing criteria can be dependent on the use case. The decision tree and testing flow for use case is shown in FIG. 27. This series of tests can be performed at any interval and records kept, aiding in the tracking of degradations and predicting future degradation. If the tests are done in the prescribed order, according to FIG. 27, a failed test indicates where, in the kinematic chain, a degradation is originating, providing a target component to repair or replace. After a failure of a test point, all points tested further along the kinematic chain may be unreliable without understanding of the cause of the failed test.

Measuring or testing the selected key points along the kinematic chain can be done in many ways. Regardless of the specific details, there will be a sensor and a target, which the sensor measures. Measurements can be made through physical contact, visual imaging, or another type of measurement technology. In the position verification sensor, the position verification sensor outputs information on the position of a specific point or object.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A position verification sensor that produces a discrete output for determining an accuracy of mutual mechanical positioning with a key, the position verification sensor comprising:
   a sub stratum;
   a housing disposed on the substratum;
   a receiver pad disposed in the housing and that:
      receives contact with the key when the key is communicated through a keyway aperture;
      produces a target output in response to contact with the key; and
      produces a null output in absence of contact with the key;
   an aperture cap disposed on the housing and comprising:
      a cap surface; and
      the keyway aperture disposed in the aperture cap and bounded by a wall of the aperture cap, the keyway aperture comprising a shape and size selected to receive and selectively communicate the key through the keyway aperture, such that the aperture cap:
         selectively communicates the key through the keyway aperture to the receiver pad when the key and the keyway aperture are compatibly aligned; and
         receives the key on the cap surface when the key and the keyway aperture are incompatibly aligned so that:
            the key contacts the cap surface instead of being communicated through the keyway aperture; and
            receives a depression force from the key,
      the receiver pad being interposed between the substratum and the aperture cap; and
   a compliant member interposed between the substratum and the housing through which the substratum and the housing are in mechanical communication and that:
      rests in a primary position in an absence of the key disposed on the cap surface of the aperture cap;
      receives the depression force from the aperture cap;
      reciprocatively depresses, from the primary position to a depressed position, in response to receiving the depression force and being pushed upon by the key; and
      reciprocatively returns, from the depressed position to the primary position, when the key is removed from contact with the aperture cap.

2. The position verification sensor of claim 1, further comprising a pad support mechanically interposed between the receiver pad and the substratum.

3. The position verification sensor of claim 2, wherein the pad support depresses in response to contact of the key with the receiver pad.

4. The position verification sensor of claim 1, wherein the receiver pad is disposed on the aperture cap.

5. The position verification sensor of claim 1, further comprising an electrical contact disposed on the aperture cap and in electrical communication with the receiver pad.

6. The position verification sensor of claim 5, further comprising a second electrical contact disposed on the receiver pad and in electrical communication with the electrical contact.

7. The position verification sensor of claim 1, further comprising a second receiver pad disposed on the cap surface of the aperture cap, wherein the aperture cap is interposed between the second receiver pad and the receiver pad,
   the second receiver pad comprising a second keyway aperture that communicates the key through the second keyway aperture to the aperture cap when the key has a size and orientation that are compatible with a size and orientation of the second keyway aperture.

8. The position verification sensor of claim 7, wherein the second receiver pad:
   receives contact with the key when the key is communicated through a third keyway aperture and the key is not aligned with the second keyway aperture;
   produces a second target output in response to contact with the key; and
   produces a second null output in absence of contact with the key.

9. The position verification sensor of claim 8, further comprising a second aperture cap disposed over the second receiver pad, wherein the second receiver pad is interposed between the second aperture cap and the aperture cap, the second aperture cap disposed on a second housing and comprising:
   a second cap surface; and
   the third keyway aperture disposed in the second aperture cap and bounded by a second wall of the second aperture cap, the third keyway aperture comprising a shape and size selected to receive and selectively communicate the key through the third keyway aperture, such that the second aperture cap:
      selectively communicates the key through the third keyway aperture to the second receiver pad when the key and the third keyway aperture are compatibly aligned; and
      receives the key on the second cap surface when the key and the third keyway aperture are incompatibly aligned so that:
         the key contacts the second cap surface instead of being communicated through the third keyway aperture; and
         receives the depression force from the key.

10. The position verification sensor of claim 9, further comprising a second housing disposed on the substratum and:
    in which the second receiver pad and the receiver pad are disposed; and
    on which the second aperture cap is disposed.

11. The position verification sensor of claim 10, further comprising a second compliant member interposed between the substratum and the second housing through which the substratum and the second housing are in mechanical communication and that:
    rests in a second primary position in an absence of the key disposed on the second cap surface of the second aperture cap;
    receives the depression force from the second aperture cap;
    reciprocatively depresses, from the second primary position to a second depressed position, in response to receiving the depression force and being pushed by the depression force from the key; and reciprocatively returns, from the second depressed position to the second primary position, when the key is removed from contact with the second aperture cap.

12. A process for determining an accuracy of mutual mechanical positioning of a key and the position verification sensor of claim 11, the process comprising:
   moving the key relative to the position verification sensor;
   contacting position verification sensor with the key;
   producing the null output if the key does not contact the receiver pad; and
   producing the second target output if the key contacts the second receiver pad to determine the accuracy of mutual mechanical positioning of the key and the position verification sensor.

13. A process for determining an accuracy of mutual mechanical positioning of a key and the position verification sensor of claim 1, the process comprising:
   moving the key relative to the position verification sensor;
   contacting position verification sensor with the key;
   producing the null output if the key does not contact the receiver pad; and
   producing the target output if the key contacts the receiver pad to determine the accuracy of the mutual mechanical positioning of the key and the position verification sensor.

* * * * *